US009949331B1

(12) United States Patent
Coombes et al.

(10) Patent No.: US 9,949,331 B1
(45) Date of Patent: Apr. 17, 2018

(54) AUTOMATED LUMINAIRE IDENTIFICATION AND GROUP ASSIGNMENT

(71) Applicant: Gooee Limited, St Albans (GB)

(72) Inventors: Simon Coombes, St Petersburg, FL (US); Jonathan Couch, Wilshire (GB); Dan Andrei Tutunea, Surrey (GB); Shmuel Silverman, Novato, CA (US); Mark Wilson, London (GB)

(73) Assignee: Gooee Limited, St Albans (GB)

( * ) Notice: Subject to any disclaimer, the term of this patent is extended or adjusted under 35 U.S.C. 154(b) by 0 days.

(21) Appl. No.: 15/643,244

(22) Filed: Jul. 6, 2017

Related U.S. Application Data

(60) Provisional application No. 62/492,849, filed on May 1, 2017.

(51) Int. Cl.
*H05B 37/02* (2006.01)
*H05B 33/08* (2006.01)

(52) U.S. Cl.
CPC ..... *H05B 33/0854* (2013.01); *H05B 37/0218* (2013.01); *H05B 37/0272* (2013.01)

(58) Field of Classification Search
None
See application file for complete search history.

(56) References Cited

U.S. PATENT DOCUMENTS

| 9,609,723 | B2* | 3/2017 | Feri | H05B 37/0245 |
| 2006/0049935 | A1 | 3/2006 | Giannopoulos et al. | |
| 2008/0218334 | A1* | 9/2008 | Pitchers | H04L 41/0893 340/539.1 |
| 2008/0309259 | A1 | 12/2008 | Snijder et al. | |
| 2011/0122796 | A1* | 5/2011 | Simons | H04W 4/08 370/254 |
| 2013/0147367 | A1* | 6/2013 | Cowburn | H05B 37/02 315/152 |
| 2013/0221858 | A1 | 8/2013 | Silberstein | |
| 2014/0086590 | A1 | 3/2014 | Ganick et al. | |
| 2014/0336821 | A1 | 11/2014 | Blaine et al. | |
| 2016/0366752 | A1 | 12/2016 | Di Censo et al. | |
| 2017/0245352 | A1 | 8/2017 | Van Der Brug | |

FOREIGN PATENT DOCUMENTS

WO WO-2012131631 A1 10/2012

OTHER PUBLICATIONS

U.S. Department of Energy, LED Measurement Series: LED Luminaire Reliability, Oct. 2009, 4 pages, www.ssl.energy.gov.
Philips, Understanding power LED Lifetime analysis, Technology White Paper, Dec. 5, 2016, 11 pages, www.lrc.rpi.edu/programs/solidstate/assist/index.asp.

* cited by examiner

*Primary Examiner* — Dedei K Hammond
(74) *Attorney, Agent, or Firm* — Moyles IP, LLC

(57) ABSTRACT

The disclosed devices, systems, and methods may be used to automatically identify, locate, and assign luminaires into groups such that lighting systems may be more efficiently configured, used, and maintained especially in large buildings, etc. For example, a wink function may be used with a system of sensors which are capable of detecting light patterns from individual and groups of luminaires to form virtual maps of luminaire locations which may be correlated with actual luminaire floor plans to efficiently identify, locate, and group the luminaires.

20 Claims, 20 Drawing Sheets

Signal Strength

| dBm | A | B | C | D | E |
|-----|-----|-----|-----|-----|-----|
| A | 0 | -59 | -73 | -59 | -72 |
| B | -60 | 0 | -41 | -53 | -41 |
| C | -74 | -42 | 0 | -69 | -60 |
| D | -58 | -53 | -70 | 0 | -41 |
| E | -72 | -42 | -59 | -41 | 0 |

Groups

| | A | B | C | D | E |
|-----|-----|-----|-----|-----|-----|
| Group | 1 | 2 | 2 | 2 | 2 |

Ambient light
| %  | A   | B   | C  | D   | E   |
|----|-----|-----|----|-----|-----|
| A  | 100 | 0   | 0  | 14  | 9   |
| B  | 1   | 100 | 82 | 65  | 79  |
| C  | 0   | 81  | 0  | 57  | 70  |
| D  | 15  | 67  | 58 | 100 | 83  |
| E  | 8   | 80  | 69 | 84  | 100 |
FIG. 16
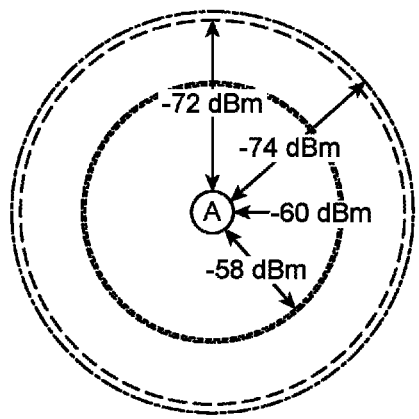
FIG. 17
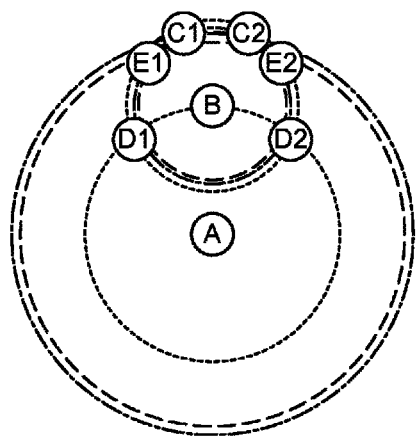
FIG. 18

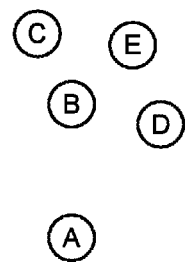
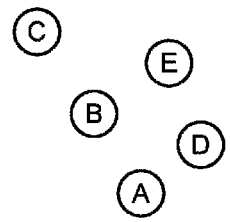
FIG. 21  FIG. 22
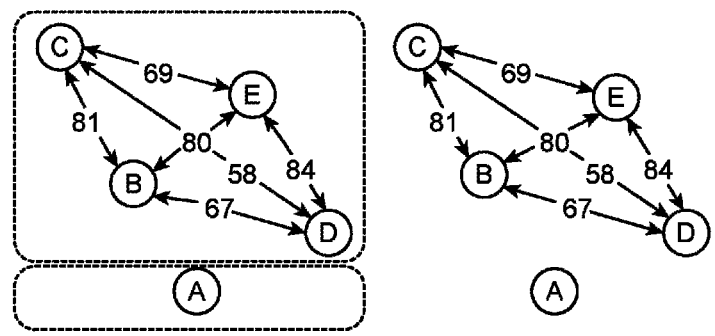
FIG. 23
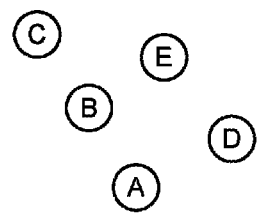
FIG. 24

AUTOMATED LUMINAIRE IDENTIFICATION AND GROUP ASSIGNMENT

CROSS-REFERENCE TO RELATED APPLICATIONS

This application claims the benefit of U.S. Provisional Application No. 62/492,849 filed May 1, 2017, which is incorporated herein by reference in its entirety.

FIELD

The current disclosure relates generally to a system, which automates luminaire location identification and group assignment. In particular, devices, systems, and methods for automatic luminaire identification and group assignment using wink function for commissioning lighting control systems are disclosed.

BACKGROUND

In lighting control systems with distributed networked/intelligent devices it is imperative that each of the unique network addresses are correctly identified and associated with their relevant locations/areas of control to facilitate correct operational configuration of the system.

Current identification methods include a Detachable Printed ID Number, which is an identification number and/or scan-code sticker that is removed from the device upon installation and fixed to an installation drawing in its relevant location. This is then later referred to when commissioning/configuring the system. Other identification methods include a barcode (or other scan-code medium), which is removed and affixed to a drawing for later scanning or scanned in-situ and used to directly update information within a commissioning application (software or handheld tool). A service pin may also serve as an identification method. If the identification of installed devices has not been previously recorded, it is then possible to identify networked devices by pressing a 'service pin' (physical button on the device) with a commissioning app/tool in a listening mode. The address of the device is then displayed or assigned to a pre-configured 'dummy'/virtual device. Additional identification methods include a wink function to facilitate observational identification of luminaires particularly with networked DALI addressed devices, which generally do not support the previous methods, the network is scanned for previously un-provisioned devices using a commissioning app/tool, which are then listed on screen. A 'wink' option button for each of the results is provided and when selected causes the related luminaire to flash on and off repeatedly. When witnessed by the engineer, the device address can then be correctly assigned.

Once the addresses of all luminaire control devices are known along with location information, the next process conducted will be to assign them to operational groups, representing areas such as rooms and corridors. This is ordinarily achieved by manually assigning known addressed devices to a group object so that all members can be controlled by a single command/message when later configured/programmed.

As the size of a single lighting control network grows beyond that of a single zone of a floor, to the whole floor, the whole building and areas beyond, the time and labor expended on luminaire/networked device identification will likely be quite extensive. Most presently employed methods of device identification require some form of direct manual interaction and/or direct observation of the individual luminaire being identified.

With the emergence of Internet of Things (IoT) based lighting control systems, the size of a single installation when compared to existing localized networked solutions will grow in size significantly due to the absence of limitations imposed by more localized technologies. As such, in order to reduce the installation and commissioning time for a large project based on the issues outlined, the requirement for an automated method of luminaire/device discovery/identification and group assignment becomes apparent.

If during the physical installation of an intelligent lighting control system, all information regarding addresses and locations has been accurately mapped and added directly to a commissioning application/tool or drawing, the issue of post-installation identification may not generally present a major problem, however from experience this is not always accurately carried out by electricians/installers and physical media such as installation drawings (with IDs attached) can be lost/damaged.

Given the state of the art, there is a need for a system and method for automatic luminaire location identification and group assignment capability using wink function for commissioning a lighting control in very large ecosystems such as a whole building or a floor, in quick turn-around time and reducing manual efforts. Additionally, in very large systems with automatic group assignment capability (even when all individual device addresses are already known), an automated process could still present a significant commissioning timesaving

BRIEF DESCRIPTION

In one aspect, the present disclosure relates to systems and associated devices for automatic luminaire location identification and group assignment using wink function for lighting commissioning and control. An exemplary embodiment of such a system includes one luminaire having at least one light emitting diode within an environment. At least one gateway is in data communication with the at least one luminaire and LED and configured to control and/or communicate operations, such as ON/OFF and a dimming control of the luminaire. In the exemplary embodiment, the gateway includes a control interface programmed with the protocols for controlling the luminaire and/or LED operations.

The exemplary embodiment further includes a sensor subsystem in data communication with the luminaire, LED, and gateway, and a server in data communication with the sensor subsystem and gateway. The sensor subsystem is configured to measure and transmit, e.g., color and environmental data to the server via the first gateway. The server may receive the data transmitted by the sensor subsystem, identify each luminaire and create a virtual map of luminaire positions in the environment based on the received data, compare the luminaire positions in the virtual map with luminaire positions in a real floor plan of the environment, and assign each identified luminaire to a luminaire position in the real floor plan.

Further, in the exemplary embodiment, the server is configured to assign identified luminaires to a group of luminaires based on the disclosed methods. In addition, the server may be configured to control the dimming function of the luminaire/LED via a dimming control unit and/or the gateway. The server may also be configured to control the ON/OFF and other luminaire/LED operations via the gateway.

In other aspects, the present disclosure relates to methods for automatic luminaire location identification and group assignment using wink function for lighting commissioning and control. For example, switching OFF all unidentified luminaires, collecting with a sensor subsystem ambient color and environmental data of the environment, winking ON then OFF unidentified luminaires one by one, detecting with the sensor subsystem light patterns emitted by the unidentified luminaires, and storing the light patterns in a server as a two-dimensional array. The exemplary method then includes switching ON a luminaire in the first two-dimensional array and assigning the luminaire as a member of a lighting control group by, e.g., detecting with the sensor subsystem light patterns emitted by the remaining luminaires, and storing the light patterns as a second two-dimensional array in the server. The first and second two-dimensional arrays are then combined to create a virtual map of the luminaires, which is compared to a real floor plan to assign each luminaire to a position in the real floor plan.

Further, the exemplary method comprises comparing with the server the first and second two-dimensional arrays to identify localized changes in lighting levels within a focused area of the first two-dimensional array representing at least one new luminaire that is within proximity to a luminaire within a lighting control group and adding the at least one new luminaire to the lighting control group.

In other aspects of exemplary disclosed methods, wireless signal strength and/or color or light intensities between luminaires and/or sensor subsystems may be used to locate luminaires, detect proximity between luminaires, identify localized changes in lighting levels, and assign luminaires to lighting control groups.

BRIEF DESCRIPTION OF THE DRAWINGS

The above and still further features and advantages of the disclosed embodiments will become apparent upon consideration of the following detailed description of embodiments thereof, especially when taken in conjunction with the accompanying drawings, and wherein:

FIG. 16 is a diagram illustrating process of acquiring the difference between baseline and test ambient light levels, according to an aspect;

FIG. 17 is a diagram illustrating possible locations of devices identified B-E, according to an aspect;

FIG. 18 is a diagram illustrating locations of devices identified D and E, according to an aspect;

FIG. 21 is a diagram illustrating creation of a virtual map, according to an aspect;

FIG. 22 is a diagram illustrating a process of acquiring neighborhood grouping data, according to an aspect;

FIG. 23 is a diagram illustrating overcoming of obstructions in light signal strength data by using neighborhood group data, according to an aspect;

FIG. 24 is a diagram illustrating creation of a virtual map, according to an aspect;

Figure 1:
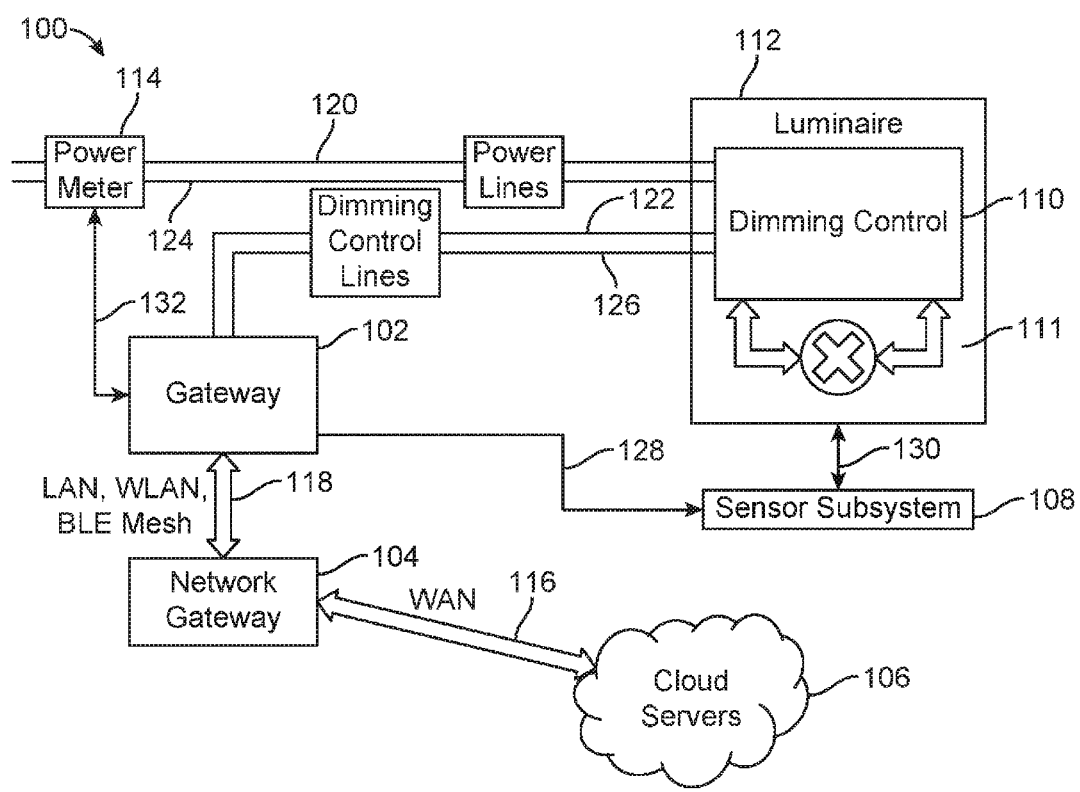
FIG. 1 illustrates a system diagram of a gateway, according to an aspect.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

The headings used herein are for organizational purposes only and are not meant to limit the scope of the description or the claims. To facilitate understanding, reference numerals have been used where possible, to designate like elements common to the figures.

DETAILED DESCRIPTION

Embodiments of the present disclosure relate generally to systems, associated devices, and methods for automated luminaire identification and group assignment. The systems and methods facilitate automatic luminaire identification (unique addresses) and group assignment capability for commissioning a lighting control. Additionally, they provide dimming control, and facilitate ease of system integration associated with the vast size of required system, as well as ease of use and installation of such systems.

Embodiments of the present disclosure will be illustrated below in conjunction with the various figures.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated those individual aspects of the present disclosure can be separately claimed.

The term "computer-readable medium" as used herein refers to any tangible storage and/or transmission medium that participates in storing and/or providing instructions to a processor for execution. Such a medium may take many forms, including but not limited to nonvolatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to email or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Further, while reference is made to various types of databases, it will be understood by one of ordinary skill in the art that all of the database functions may be stored within compartments of a single database, or within individual databases. In any event, the disclosure is considered to include a tangible storage medium or distribution medium and prior art-recognized equivalents and successor media, in which the software implementations of the present disclosure are stored.

FIG. 1 depicts an illustrative embodiment of a system 100. The system 100 may also be referred to as a scenario/an environment. According to an aspect, the system 100 includes at least one protocol agnostic Universal Smart Lighting Gateway (USLG) 102, at least one of a plurality of luminaires 112 and a plurality of LED's 111, and a dimming control 110. In an embodiment, the luminaire 112 is a system that may include a single luminaire or multiple luminaires connected with a single common interface to power lines 120, 124 and dimming control lines 122, 126. According to an aspect, a power meter 114 is connected electrically between the USLG 102 and the luminaire 112 and is connected electrically to the luminaire 112 via the power lines 120, 124. The power meter 114 may be connected to the USLG 102 via the power meter interface 132. The power meter 114 connections are described in further detail hereinbelow, with reference to FIG. 2.

According to an aspect and with reference to FIG. 1, a system 100 for automatic luminaire identification (unique addresses) and group assignment capability for commissioning a lighting control is described. The system 100 includes at least one of a plurality of luminaires 112 and a plurality of LED's 111, a dimming control 110, at least one gateway 102, at least one network gateway 104, at least one sensor subsystem 108, at least one wireless device 116 for exchanging data, and at least one cloud server 106. The luminaire 112 may include a single luminaire or multiple luminaires connected with a single common interface to power lines 120, 124 and dimming control lines 122, 126. The luminaire 112 is connected to one or more sensors found in the at least one sensor subsystem 108. The sensors may be connected to the at least one gateway 102, which is a device configured to control and communicate with the luminaire 112. The sensors may include at least one color sensor and/or at least one environment sensor. In an embodiment, the environment sensor is a down looking environment sensor which is an array of 32×32 pixels or 15×15 pixels. The at least one color sensor faces the plurality of luminaires, and senses at least one of a color content and a color intensity of at least one of the plurality of luminaires and the plurality of LED's and the at least one environment sensor senses a nearby environment of the plurality of luminaires while facing away from the plurality of luminaires. The at least one down looking environment sensor comprises at least one of an ambient light sensor, an orientation sensor, a movement detection sensor, and a temperature sensor. The at least one server 106 is configured to direct and control the at least one gateway 102. According to an aspect, a power meter 114 may be connected electrically between the gateway 102 and the luminaire 112 and may be connected electrically to the luminaire 112 via the power lines 120, 124. The power meter 114 may be connected to the gateway 102 via the power meter interface 132. The at least one of the plurality of luminaires 112 and the plurality of LED's 111 are individually controlled by the at least one wireless device.

As illustrated in FIG. 1, the sensor subsystem 108 connects via connection 130 to the luminaire 112 on one side and via a sensor interface 128 to the gateway 102 on the other side. The at least one sensor subsystem 108 detects information related to the system 100 and the luminaires 112 by detecting current conditions of at least one of the luminaires 112. The sensor subsystem 108 includes one or more sensors to sense and capture environmental data such as motion, direction, footfall, ambient light level and temperature, light intensity or output, operating temperature, etc. Thus, the current conditions of the luminaires 112 can be detected, whether that be the current color level or intensity, the current temperature or voltage or humidity of the like, the current dimming level, and the like. The information or data is relayed to the gateway 102, which relays the information or data to the server 106 for storage, processing and the like. Thus, the sensor subsystem 108 senses/detects environmental data in real time. The information or data collected by the gateway 102 includes a current power level of the luminaires 112 as measured by the power meter 114, which measures the current power level being used by the luminaires 112. The gateway 102 is configured to receive information related to the plurality of luminaires 112, and the information includes the color intensity and at least one environmental condition sensed by the sensor subsystem 108.

The gateway 102 is configured to gather and communicate the sensors output of the at least one of the plurality of luminaires 112 and the plurality of LED's 111 to the cloud server 106. In an aspect, the gateway 102 may be capable of detecting, communicating and handling/controlling a plurality of dimming protocols via the dimming control device 110, and to control the dimming control device 110 to provide a plurality of dimming levels to the luminaires 112. The output from the sensors is fed to the cloud server 106 through the gateway 102 and network gateway 104. The cloud server 106 processes and thereby enables automatic identification of the luminaires 112 within an enclosed environment and communicates required data to a user device with a user interface. Once the luminaires are identified and grouped using wink function, a virtual map is created using data acquired from the at least one wireless device, neighborhood group and light intensity signal strength data, where all luminaire devices are located correctly relative to each other. The positions of the luminaire devices within the virtual map are compared with the positions of the luminaire devices in real floor plan, and each luminaire device is assigned to the correct location thus creating location identification without knowing the group. The user obtains the updates and status of the luminaires 112 in the particular or all ecosystems through the gateway 102. The gateway 102 receives control function from the user device to actuate the luminaires 112 with control parameters from remote location. The gateway 102 discovers at least one dimming control protocol installed in the plurality of lighting devices and controls the dimming levels of the plurality of lighting devices. The gateway 102 is configured to control the power to the luminaire and dim the luminaire to 0 or shut it off completely.

Figure 3:
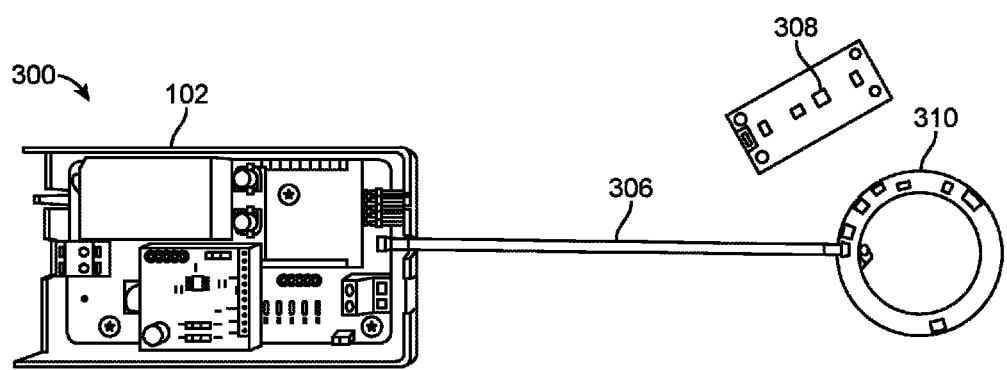
FIG. 3 illustrates a diagram of a sensor connection to a luminaire, according to an aspect.

As illustrated in FIG. 1 and according to an aspect, the system 100 includes a sensor subsystem 108 that connects via connection 130 to the luminaire 112 on one side and to the USLG 102 via a sensor interface 128 on the other side. According to an aspect, the connection 130 to the luminaire 112 is physical and is not limited to a specific location. The location of the sensor subsystem 108 may be different for various types of sensors that are to be positioned. As seen in FIG. 3, for instance, physical sensor interfaces 306 and connections may include the sensor interface 128 connected to the USLG 102. According to an aspect and with reference again to FIG. 1, the system 100 includes a backhaul interface 118 connected to the USLG 102 and a network gateway 104. The backhaul interface 118 may be wired or wireless Local Area Network (LAN), including one or more of Mesh Bluetooth Low Energy (Mesh BLE), Smart Mesh, Bluetooth Mesh, WLAN, ZigBee, and/or Ethernet LAN. In an embodiment, the backhaul interface 118 is Mesh BLE. According to an aspect, the USLG 102 is connected with the network gateway 104, which resides between the local networks to a wide area network (WAN) 116. In an embodiment, the WAN 116 connects the USLG 102 to cloud computers/servers 106 for operational and management interfaces.

Figure 2:
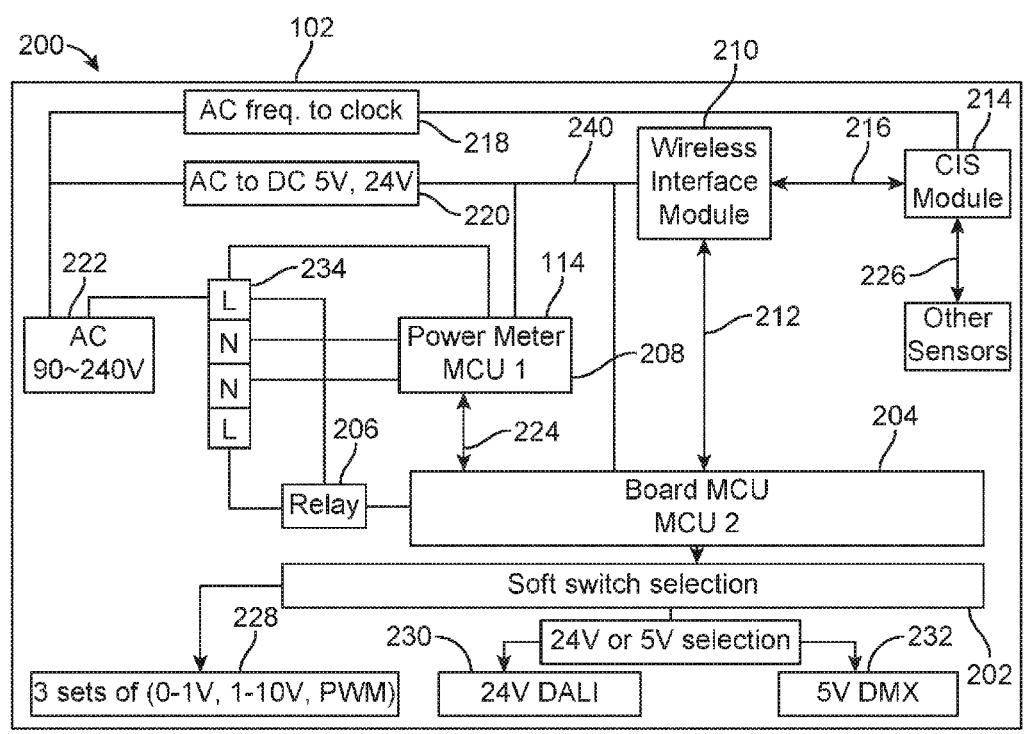
FIG. 2 illustrates a gateway box diagram, according to an aspect.

FIG. 2 depicts the USLG 102 in further detail. According to an aspect, the USLG is provided in a system 200 that includes a soft switch 202 to select between different electrical dimming interfaces. The soft switch 202 may be actively used to search for the correct protocol between the USLG 102 and the luminaire 112 (not shown in this figure). The luminaire 112 may be a dimming luminaire 112. According to an aspect, protocol modules 228, 230, and 232 are the software implementation of the dimming interfaces that reside in the USLG 102. In an embodiment, the supported dimming protocol include several sets of protocols, such as, for example, 0V-10V, 1V-10V, PWM 228, protocols over 0V-10V and/or 1V to 10V, a 24V DALI 230 protocol, and a 5V DMX 232 protocol. The protocols may each include algorithms, which may be implemented in a Micro Controller Unit 2 (MCU-2) 204. According to an aspect, the MCU-2 204 is powered by an AC to DC 5V, 24V power module 220 via a power line connection 240. MCU-2 204 may also be connected to a power meter 114 via a Micro Controller Unit 1, e.g., MCU-1 208 and a Universal Asynchronous Receiver/Transmitter (UART) 224. According to an aspect, MCU-2 204 is also connected to a Relay 206. MCU-2 204 may also be connected to a Wireless Interface Module (WIM) 210 via a Serial Peripheral Interface (SPI) bus 212. In an embodiment, the MCU-2 204 also controls the Relay 206, which may be designed to cut off/block the current to the luminaire 112 upon a decision by the MCU-2 204. The power cutoff can be used to disconnect power from the controlled luminaire subsystem (see, for example, FIG. 1). In an embodiment, the WIM 210 is implemented as Bluetooth Low Power (BLE) device that uses the Mesh BLE protocol to connect with other devices, as well as having the SPI bus 212 and an Inter-Integrated Circuit Two-Wire Serial Interface bus (TWSI) 216. The WIM 210 is connected to the Camera Interface System (CIS) module 214, which may be, for instance, an environment sensor and a Red, Green, Blue (RGB) sensor combination device. The CIS module 214 can be extended via a second TWSI bus 226 with other sensor modules. The CIS module 214 may require a clock, which is received via an AC Frequency to a clock module interface 218. The WIM 210 may require power, which is typically received via the AC to DC 5V, 24V power module 220 via the power interface line 240. According to an aspect, an AC Power 90V-240V power module 222 is relayed to the MCU-2 204 via a Line Control (LNNL) 234, and relayed from the MCU-2 204 to the soft switch 202 for power selection for the dimming protocol interfaces. The AC Power module 222 may also be relayed via the LNNL 234 to the power meter 114, which measures all power delivered to the luminaire 112. The LNNL 234 illustrated in FIG. 2, and according to an aspect, provides the physical electrical line connections.

The power meter 114 connections are described in further detail, with reference to FIG. 2. The power meter 114 may be connected to an input line of the luminaire 112 (as shown in FIG. 1), in such a way that the power meter 114 measures electrical power drawn by the luminaire 112 at any given moment in real time. For purposes of this disclosure, "real time" refers to a substantially continuous and/or current nature of a value, measurement, or action subject to known delays that may exist due to current technologies, transmission times, user delays, or other factors that may cause a delay in the delivery of "real time" information. The term "real time" is not used to imply any particular timeframe or limitation with respect to delivery of information and should not be interpreted as such.

According to an aspect, the power meter 114 is connected to the gateway 102 to provide real time power measurements correlated 1-1 to luminaire power drawn at any given moment. The power meter 114 ensures turning ON the luminaire and completely turning OFF during winking function. The interface 132 between the gateway 102 and the power meter 114 may be a Universal Asynchronous Receiver/Transmitter (UART) or other communication interface ("power meter interface"). The interface 120, 124 between the power meter device 114 and the luminaire 112 may depend on the type of power meter 114 being used as will be understood by a person of ordinary skill in the art.

According to an aspect, and as illustrated in FIG. 3, the system 300 may include one or more sensors 308, 310, typically configured as CIS modules, connected to the USLG 102. FIG. 3 illustrates an embodiment that includes at least one of a first CIS module 308 and a second CIS module 310. (Only one connection is actually depicted, but it would be understood by one of ordinary skill in the art that one or both of the sensors 308, 310 can be connected to the USLG 102.) According to an aspect, the CIS modules 308, 310 may include a physical interface 306 with the USLG 102 via a TWSI connection that uses a 6 or 8 pin Flexible Printed Circuit (FPC) cable and connector. The CIS modules 308, 310 may be physically connected at any desired position on the luminaire 112 (not shown). According to an aspect, the CIS module 308 is a linear module that can be adopted to fit on luminaires 112/devices that require a linear fitting. In an embodiment, the CIS module 310 is circular, and may be designed to fit circular-shaped luminaires 112.

In an embodiment, each of the CIS 308 and CIS 310 sensors include at least two sets of sensors (not shown). A first set of sensors (e.g., "environment sensors") may be dedicated to environment sensing, and may be arranged such that they face away from and/or extend in a downward fashion from the luminaire 112. According to an aspect, a second set of sensors or a single sensor (e.g., a "color sensor"/"RGB sensor") is arranged such that it faces the luminaire 112 directly. The first set is named the environment sensor and the second set is named the RGB sensor. The combination of the two sets of sensors, namely the environment sensor and the RGB sensor, may be combined into a single Application-Specific Integrated Circuit (ASIC) or may be arranged as a set of separate devices. According to an aspect, the first and second set of sensors of the CIS 308 and CIS 310 modules may also connect with the gateway. Both sets of sensors may provide real time measurements and assessments to the gateway. In response to the measurements and assessments provided, the gateway may control the dimming device and change the dimming level and a color temperature and RGB/RGBW (Red Green Blue Warm White) color, in devices that allow for color temperature and RGB/RGBW color control.

According to an aspect, the system 100 includes the RGB sensor directly facing the luminaires 112 (not shown). The RGB sensor may measure both the RGB content of a light source and the color/RGB intensity of the light source. According to an aspect, the RGB sensor or combination of sensors is configured to measure multiple color channels as they directly face the luminaires 112.

According to an aspect, the first set of sensors may include magnetometer 2D/3D sensor to sense and maintain correct orientation of every IoT device installed in every luminaire 112 in real time. In another aspect, the first set of sensors, which faces away from and/or extends in a downward fashion from the luminaire 112, can be utilized to track objects.

The environment sensor may be a low-resolution imaging sensor, such as an array of sensors combined into a low-resolution imaging device, or a single ASIC that is an imaging sensor. According to an aspect, the environment sensor measures environmental parameters and is/are facing away from the luminaries 112. The environment sensor may be arranged to monitor the environment of the light source. According to an aspect, the environment sensor includes at least three different types of sensors, such as, a low-resolution image sensor, an ambient light sensor, and a temperature sensor. Without limitation, this disclosure refers to the three sensors included in the environment sensor as "environment sensor". In an embodiment, the environment sensor includes several environment sensors. In other words, the environment sensor may include less or more sensors than described herein. Embodiments in accordance with the present disclosure can use other sensors and more types of sensors to sense the environment. According to an aspect, the environment sensor is a single sensor ASIC. To be sure, the environment sensor can be any sensor that is capable of collecting enough information to measure the environment, including, without limitation, ambient light, temperature and imaging or light intensity change over time via the imaging CMOS.

According to an aspect, the combination of the environment sensor and the color sensor is set into one of a single ASIC or a set of separate devices, all of which are also connected to the gateway 102. The sensors may be directed as follows: the color sensor faces the luminaires, and the environment sensor faces away from the luminaires in such a way that it monitors the environment. Real time measurements and assessments may be conveyed to the gateway 102 by the sensors that make up the sensor subsystem 108.

According to an aspect, the environment and color sensors of the sensor subsystem 108 are placed/connected on a fitting of the luminaire 112. The exact location of the sensors is not fixed, e.g., two different luminaires by the same manufacturer of the same type of fitting and LED specifications may be assembled such that the sensor location is different relative to the surface and dimensions of the fitting. Thus, the location of the color and environment sensors on the fitting can be anywhere within the spirit and scope of this disclosure.

Figure 4:
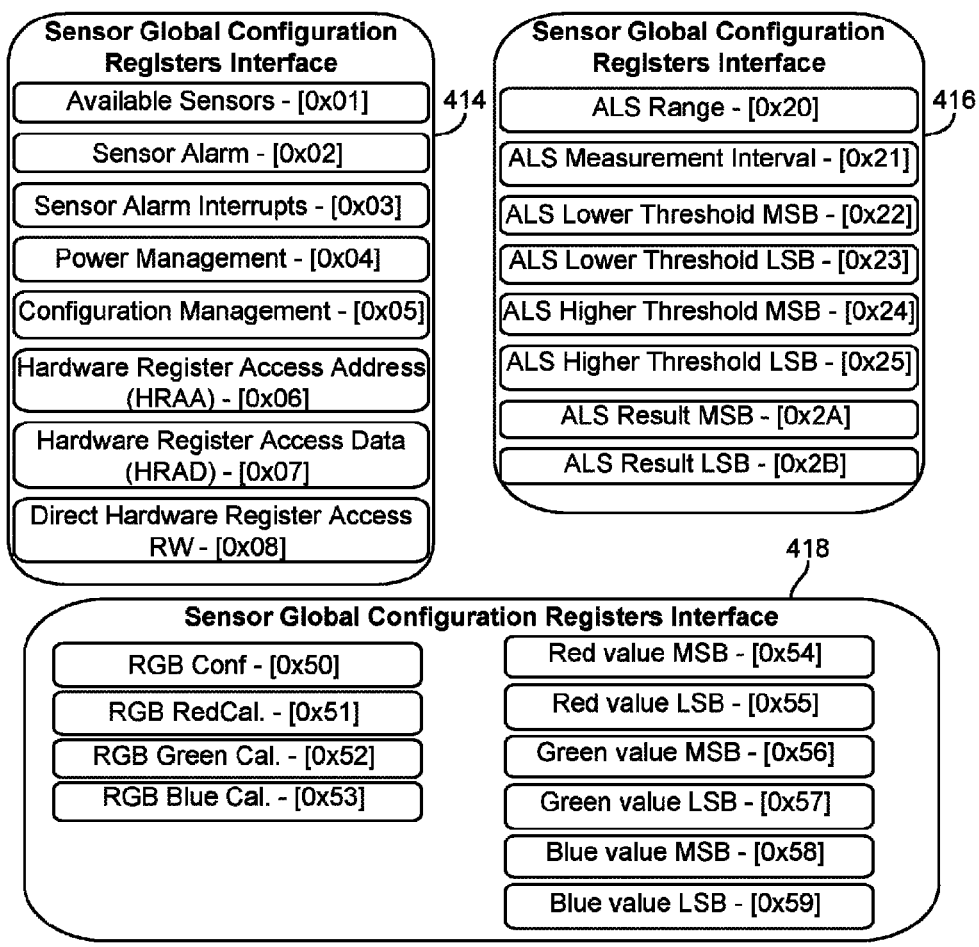
FIG. 4 is a diagram illustrating an information/data structure that is receivable by a sensor interface of a system, according to an aspect.

With reference now to FIG. 4, and continuing reference to FIG. 2, an embodiment of a sensor interface data structure 400 is illustrated. According to an aspect, the sensor interface is the TWSI 216 that allows the use of memory mapped registers to communicate information between the WIM 210 and the CIS module 214. In turn, the WIM 210 may provide this information and receive directives from the Board MCU-MCU 2 204 via a SPI bus 212. Any person of ordinary skill in the art will appreciate that the sensor module interface 212 can be very rich and may be distinct for each of the particular sensor devices used in various configurations. As illustrated in FIG. 4, and according to an aspect, the sensor device data structure 400 may include multiple registers associated with any/all of its functions. FIG. 4 depicts some of the features to exemplify the data structure 400. In an embodiment, the interface 216, 226 with the sensor device is an array of eight bit (8-bit) registers (see, for instance, Sensor Global Configuration Register Interfaces 414 and 416). Each may be mapped to a specific memory address on the WIM 210. In an embodiment, a plurality of interfaces 414, 416, 418 are provided to control the sensors 400. In the exemplary embodiment of FIG. 4, an example of a register, such as a Sensor Global Configuration Register Interface 414 is illustrated. The Sensor Global Configuration Register Interface 414 may be set as follows: the register in address 0x01 will turn on bits associated with available sensors on the module. If a sensor does not exist, its bit may be set to 0. Available sensors in this embodiment may be: Ambient LightSensor ("ALS"), Motion detection based on Passive InfraRed ("PIR"), RGB sensor ("RGB"), Motion detection and direction based on frame capture ("MOT"), LED Lumen sensor ("LL"), and Temperature sensor ("TEMP"). According to an aspect, the register address 0x02 is used as an alarm for the different sensors; e.g., one can set the value range so that when reached by the specific sensor the appropriate alarm bit in this register will turn to 1, or else it is 0. The register in address 0x03 may be used for resetting sensor alarms when this occurs. According to an aspect, the register in address 0x04 is used to power ON and/or OFF the entire sensors' system. The register in address 0x05 may be used for configuration management. Typical registers can be found in register addresses found in 0x06-0x08, as well as 0x20-0x28 and 0x50-0x59. These are merely examples, as one of ordinary skill in the art would understand—additional sensors would expand (or constrict) the registers.

Figure 5:
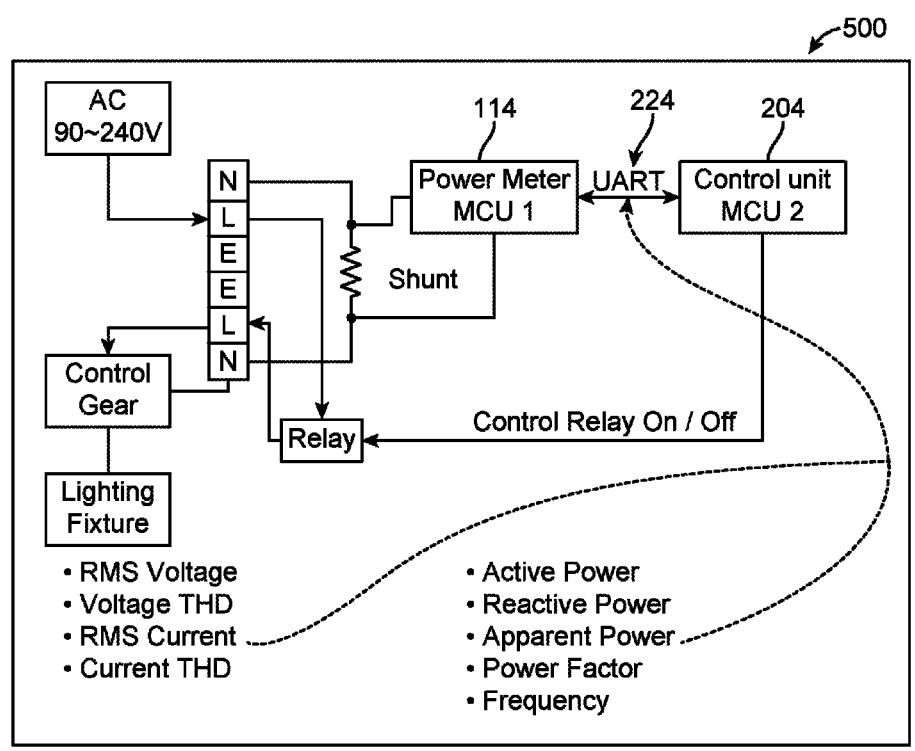
FIG. 5 is a diagram illustrating another information/data structure that is receivable over a power meter interface of a system, according to an aspect.

FIG. 5 illustrates an embodiment 500 of the power meter 114, which may be used in the system 100. A variety of known power meter 114 devices can be used within the spirit and scope of this disclosure as understood by those of ordinary skill in the art. According to an aspect, the power meter 114 may be physically connected with and/or have physical connectivity within the USLG 102 (see, for example, FIG. 1). In one embodiment, the list of information that is communicated by the power meter 114 via the UART includes: Root Mean Square (RMS) Voltage, Voltage THD, RMS current, Current Total Harmonic Distortion (THD), Active Power, Reactive Power, Apparent Power, Power Factor, and Frequency. Various known mixed signal microcontrollers 204 may be used by the system 100 within the spirit and scope of this disclosure as understood by those of ordinary skill in the art, and are able to communicate with the power meter 114. Exemplary of such microcontrollers includes those sold by Texas Instruments, Inc. under the designation "MSP430I2041" mixed signal microcontroller.

In general, aspects of the present disclosure further describe a method of automatic luminaire identification (unique addresses) and group assignment for commissioning a lighting control system. Embodiments in accordance with the present disclosure provide a method of automatic luminaire identification and group assignment using wink function. The method may include the system providing at least one of a plurality of luminaires and a plurality of LED's, providing at least one sensor subsystem to sense and capture environmental data of the luminaires in real time, wherein the plurality of luminaires are connected to a plurality of sensors. In an embodiment, the plurality of sensors is simultaneously connected to at least one gateway, which is capable of gathering and communicating the sensed data of the plurality of luminaires. The method further consists of the forwarding, by the gateway, those received sensor output processed using wink function along with power readings of the plurality of luminaires over wired/wireless networks and via Wide Area Network ("WAN") to the cloud servers for further processing. The output or data from the sensors is fed to the cloud server via the at least one gateway and network gateway. The cloud server communicates required data to a user device, thereby enables automatic identification of the luminaires within an enclosed environment. The user obtains the updates and status of the luminaires in the particular or all ecosystems through the gateway. The gateway receives control function from the user device to actuate the luminaires with control parameters from remote location.

The method includes interfacing by the gateway with a plurality of other control systems and/or devices via at least a wired connection, an Ethernet connection, a wireless connection or a combination thereof. According to an aspect, the gateway receives control function from the user device to actuate the luminaires with control parameters from remote location via its interface. The interface present in the gateway may be a backhaul interface running a backhaul protocol. In an embodiment, the backhaul protocol is responsible for delivering control functions to the gateway to actuate the luminaires with control parameters from remote location.

Figure 6A:
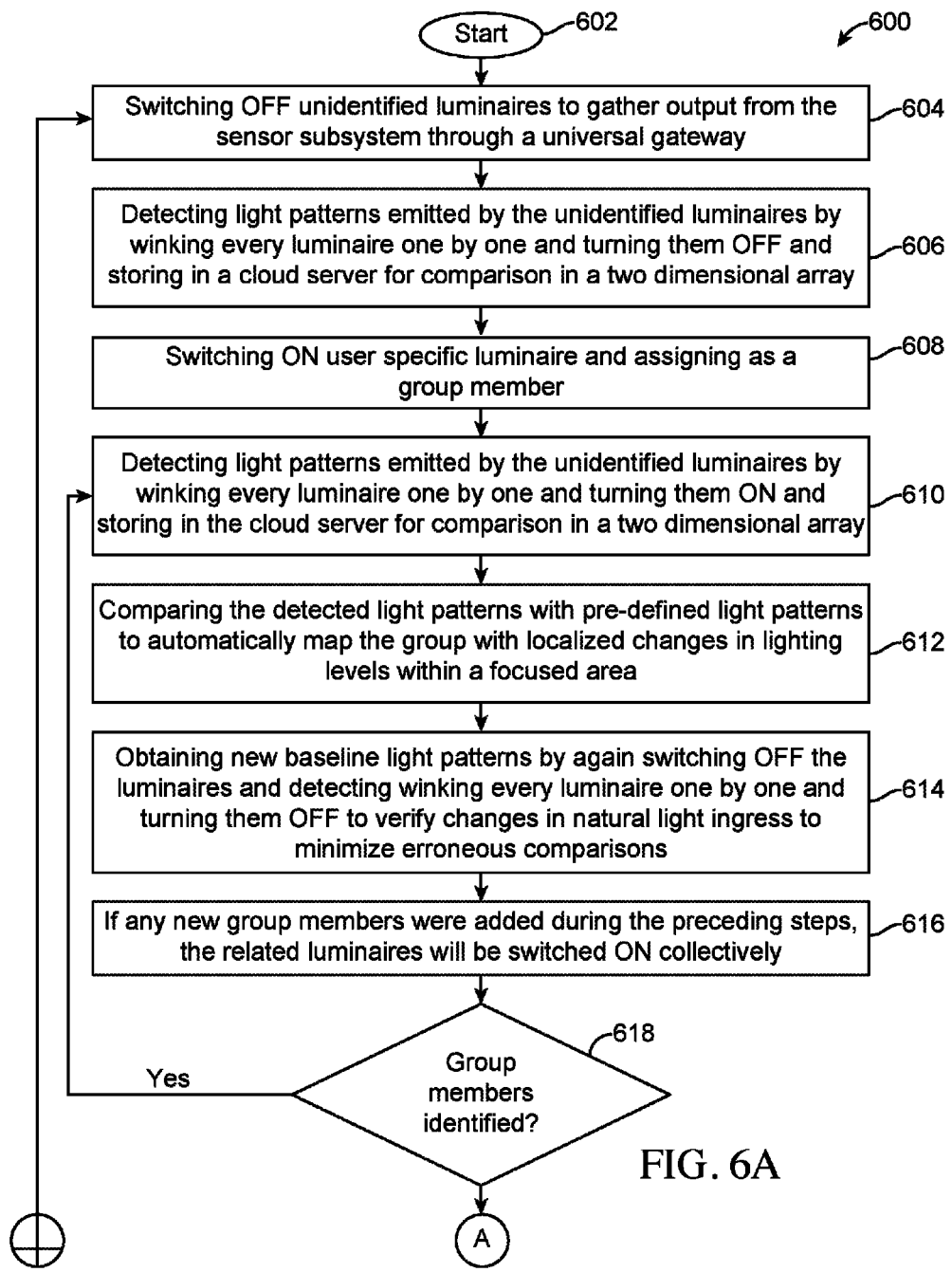
FIGS. 6A and 6B is a flow chart illustrating automatic luminaire identification and group assignment for commissioning a lighting control system, according to an aspect.
Figure 6B:
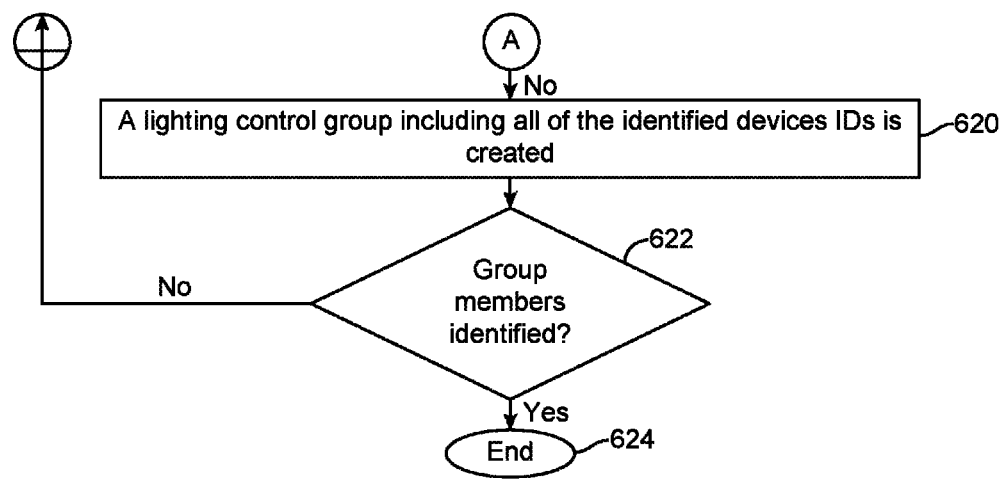

FIGS. 6A-6B collectively illustrate a flow chart of an aspect and a method 600 of a system 100. According to an aspect, system 100 is configured to perform various high-level system operations 602 via the server 106 (see FIG. 1), and in particular is configured to perform automatic luminaire identification (unique addresses) and group assignment capability for commissioning a lighting control system within an enclosed environment. The method is configured to detect whether a luminaire that is in proximity to another is illuminated. According to an aspect and as illustrated in FIG. 6A, at step 602, initiation of the system operations 602 may begin. Providing the at least one of a plurality of luminaires and the plurality of LED's, providing at least one sensor subsystem to sense and capture environmental data of the luminaires in real time, at least one sensor subsystem comprises at least one of a color sensor and at least one environment sensor, receiving a plurality of sensor output, wherein the plurality of luminaires are connected to the plurality of sensors. At step 604, all currently unidentified luminaires are switched OFF to gather output from the sensor subsystem through the gateway. At step 606, a baseline reading or output of all ambient light sensors relating to the unidentified luminaires is made by winking every luminaire one by one and turning them OFF and stored for later comparison in a first two-dimensional array consisting of network IDs, ambient light intensity values, ON/OFF state and group ID (e.g. with '0' representing unassigned).

Figure 7:
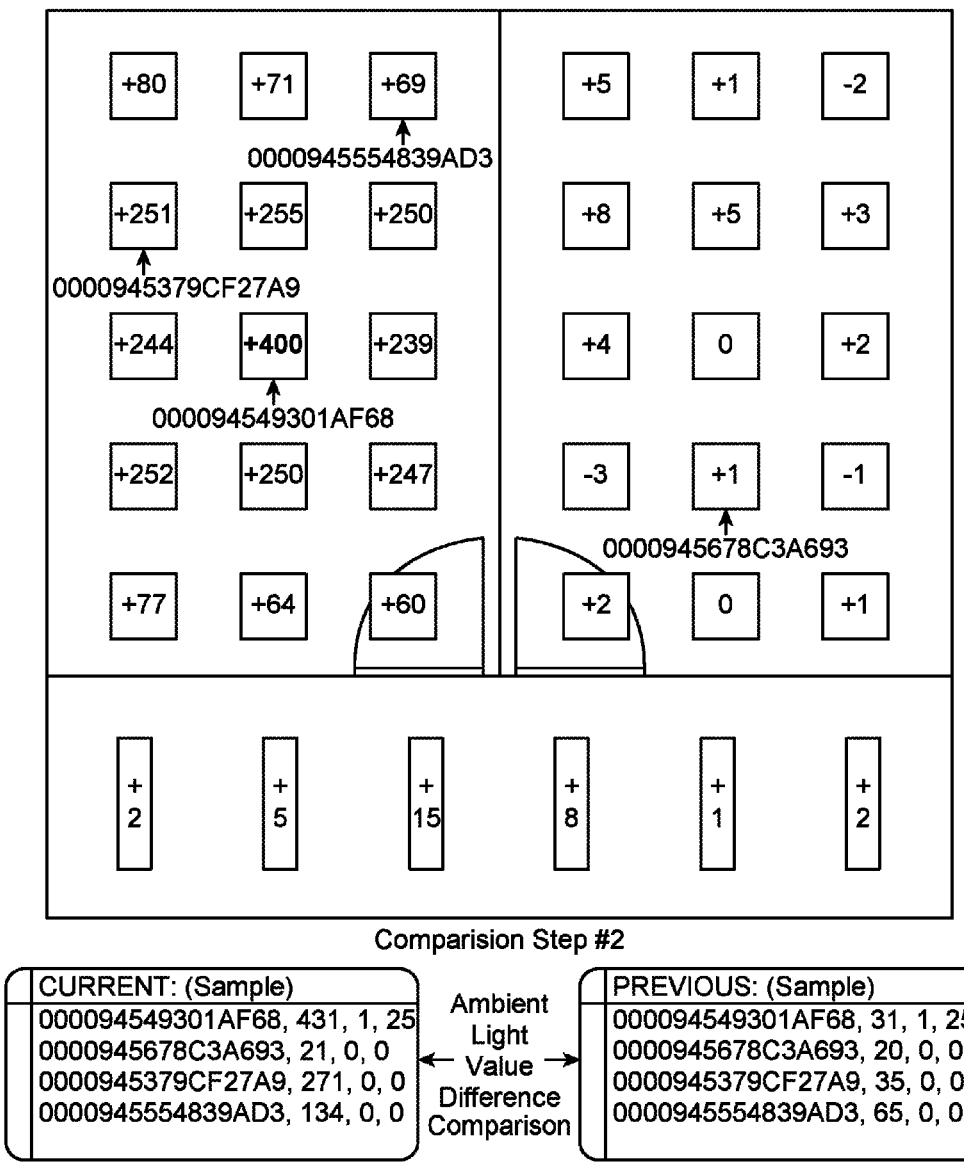
FIG. 7 is a diagram illustrating comparison of sensor readings with baseline readings, according to an aspect.
Figure 8:
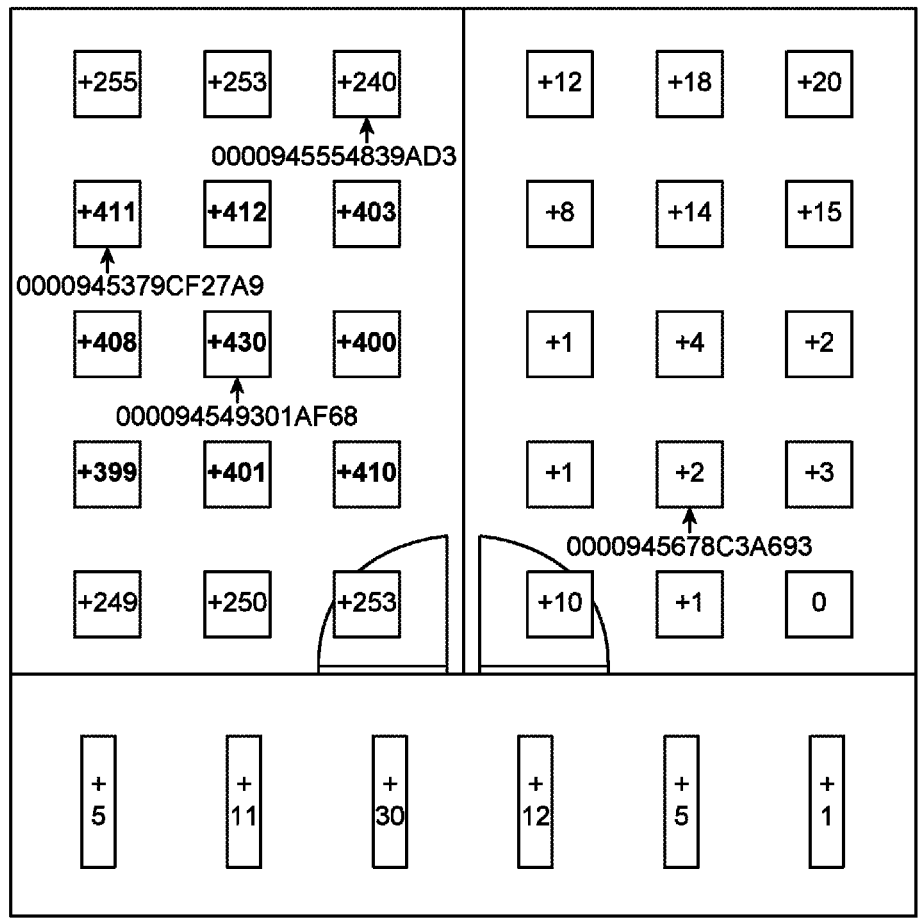
FIG. 8 is a diagram illustrating a stage where related luminaires may be switched ON, according to an aspect.
Figure 9:
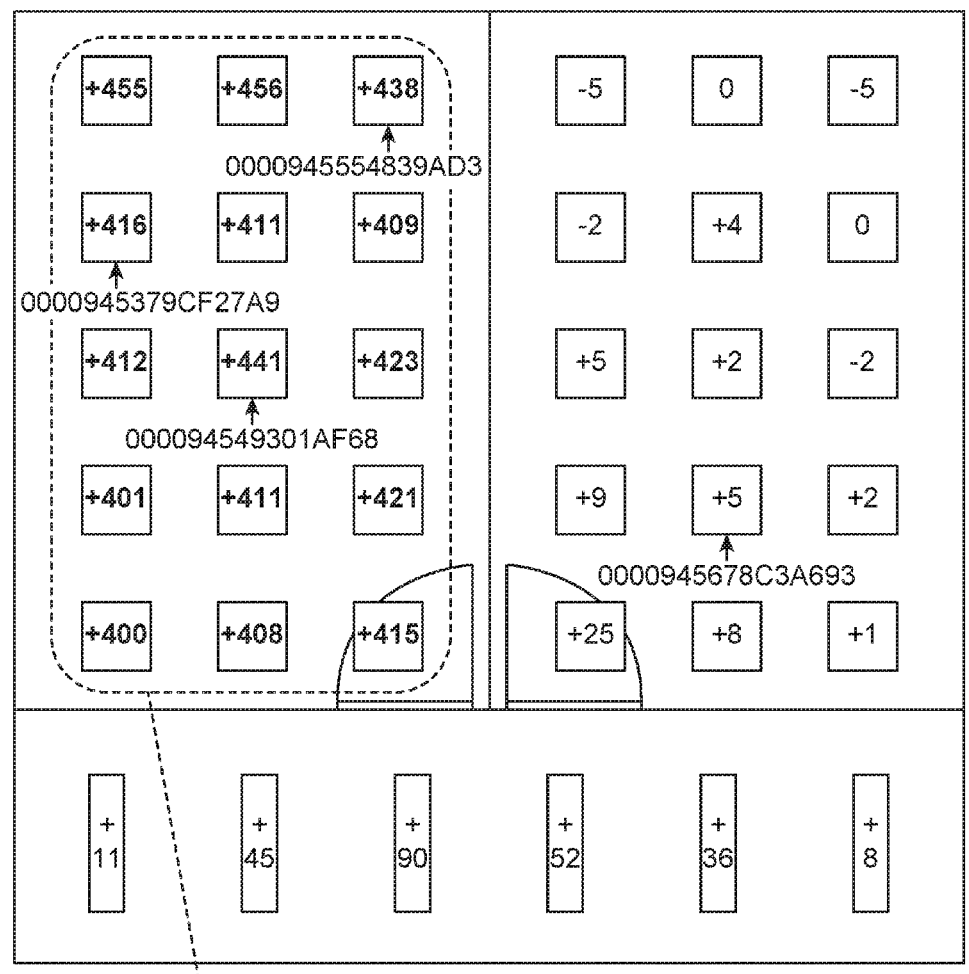
FIG. 9 is a diagram illustrating creation of lighting control group consisting of identified device IDs, according to an aspect.

At step 608, a user specified or randomly selected luminaire from the first two-dimensional array is switched ON (100% output) and assigned as a member of the next available lighting control group ID ('neighborhood' group ID), with the array updated accordingly. At step 610, another reading or output of the ambient light sensors is made by winking every remaining unidentified luminaire one by one and turning them ON and stored in a second two dimensional array (same structure as baseline) and a comparison is made with the baseline readings and the same is represented in FIG. 7. At step 612, the difference between ambient light levels (baseline readings vs current readings) is calculated and if a defined threshold (e.g., difference >=150) is exceeded by a single or number of sensors, it is assumed that the related luminaire is within the same localized space and is assigned to the current lighting control group ('neighborhood' group). Thus the method thereby detects whether a luminaire that is in proximity to another luminaire is illuminated. At step 614, all luminaires are again switched OFF and new baseline ambient light readings are taken by winking every luminaire one by one and turning them OFF to verify for any changes in natural light ingress etc. to minimize erroneous comparisons. At step 616, if any new group members were added during the preceding steps, the related luminaires will be switched ON (100%) collectively and the same is represented in FIG. 8. At step 618, steps 610 to 616 are repeated until no further group members are identified in 3 subsequent passes or a manually defined membership limit has been exceeded. As illustrated in FIG. 6B, at step 620, a lighting control group ('neighborhood' group) consisting of all of the identified device IDs is created as depict in FIGS. 8 and 9. At step 622, steps 602 to 620 are repeated until all unassigned luminaires are grouped or process aborted. If all unassigned luminaires are grouped then the process ends at step 624. The method may further comprise assigning the luminaires with unique ID to a plurality of lighting control groups based on relative locations of luminaires in the map. The method may further comprise winking or switching ON/OFF of the newly created groups as a collective entity to determine physical location of the group within the installed environment. In an aspect, the two-dimensional array includes network IDs, ambient light intensity values, ON/OFF state and group ID. Due to ambient lighting levels relating to daylight ingress, the disclosed method may advantageously be at its most efficient during hours of reduced external light although the current devices, systems, and methods are not limited by such conditions.

In an embodiment, the light patterns emitted by the unidentified luminaires are detected by using down looking environment sensor of the at least one sensor subsystem which is an array of 15×15 or 32×32 pixels and reversed motion algorithm such as Lucas-Kanade motion estimation. The environment sensor further comprises a magnetometer 2D/3D sensor thereby maintaining correct orientation of the sensors. The process is to turn the dimming level down slowly and monitor the direction of the received light. A person of ordinary skill in the art will understand that this can be done with reverse polarity of the image sensor as well as with any normal imaging sensor.

In an aspect, if the process initiator luminaires are selected at random, a final manual group identification process may be necessary to determine the actual physical location of the group within the installed environment. This can be done by winking or switching ON/OFF any of the newly created lighting control group ('neighborhood' groups) as a collective entity, which may still prove less time consuming than finding each luminaire individually. Thus, a group may be created without knowing the location or a location identification may be created without knowing the group. Additional information, such as the ID of the gateway to which the luminaire group members are assigned, can also be utilized to narrow down the location of these groups for final identification. Thus, the method along with the system when executed automatically identifies luminaires (using values gathered from locally fitted ambient light sensors) within partitioned/enclosed areas (rooms, corridors, etc.) and assigns the related unique network addresses of their associated control devices as members of collective lighting control group ('neighborhood' groups).

Figure 10:
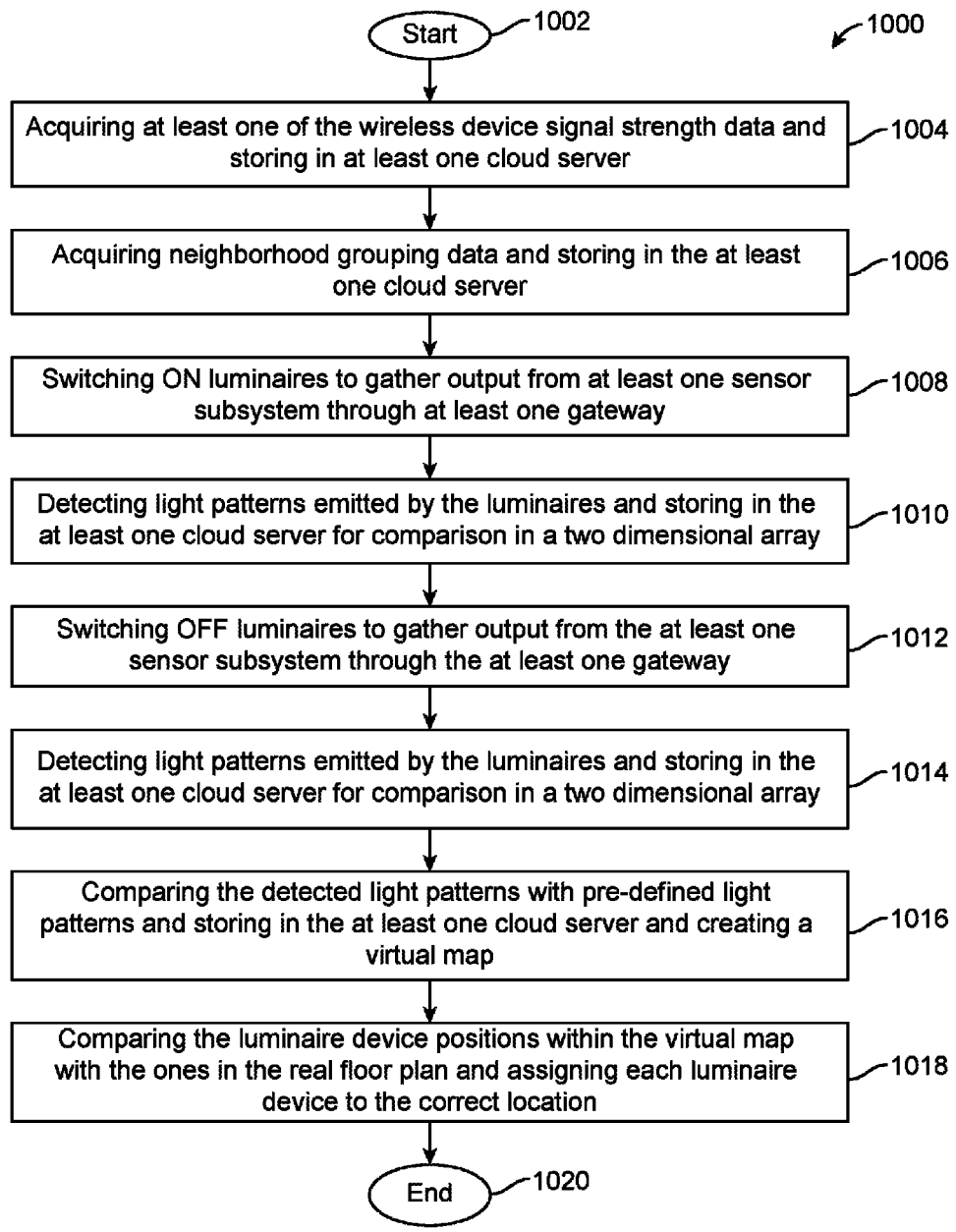
FIG. 10 is a flow chart illustrating automatic luminaire location identification, according to an aspect.

Once the luminaire identification and grouping are done, the location of the luminaire is identified. FIG. 10 illustrates a flow chart 1000 of an aspect and a method of a system 100. According to an aspect, the system 100 is configured to perform various high-level system operations via the server 106 (see FIG. 1), and in particular is configured to perform method of automatic luminaire location identification for commissioning a lighting control system. Further, the method relates to automated commissioning process resulting in correct positioning of each luminaire device to the correct floor plan location and assigning each luminaire device to the correct location within a focused area. At step 1002, initiation of the system operations 1002 may begin. The method includes, at least one of the wireless device signal strength data is acquired and stored in at least one cloud server 1004. Neighborhood grouping data may be acquired and stored in the at least one cloud server 1006. Luminaires are switched ON to gather output from at least one sensor subsystem through at least one gateway 1008 and the light patterns emitted by the luminaires are detected by winking every luminaire one by one and turning them ON and stored in the at least one cloud server for comparison in a two dimensional array 1010. Luminaires are switched OFF to gather output from the at least one sensor subsystem through the at least one gateway 1012 and the light patterns emitted by the luminaires are detected by winking every luminaire one by one and turning them OFF and stored in the at least one cloud server for comparison in a two-dimensional array 1014. The detected light patterns are compared with pre-defined light patterns and stored in the at least one cloud server and creating a virtual map 1016, where all luminaire devices are located correctly relative to each other. The luminaire device positions are compared within the virtual map with the ones in the real floor plan and assigning each luminaire device to the correct location 1018. At step 1020, the system operations end. In an embodiment, the light patterns emitted by the luminaires are detected by using down looking environment sensor of the at least one sensor subsystem which is an array of 32×32 pixels or 15×15 pixels and reversed motion algorithm. In an aspect, the light from a specific direction may be detected using single light point moving and lighting pixels of the sensor array. In another aspect, by selecting a single gateway and increasing the light of the luminaire attached to it slowly from 0 to max will generate an increased intensity coming from a specific direction. The measurements are communicated to the cloud server. Thus, a location identification may be created without knowing the group.

Figure 11A:
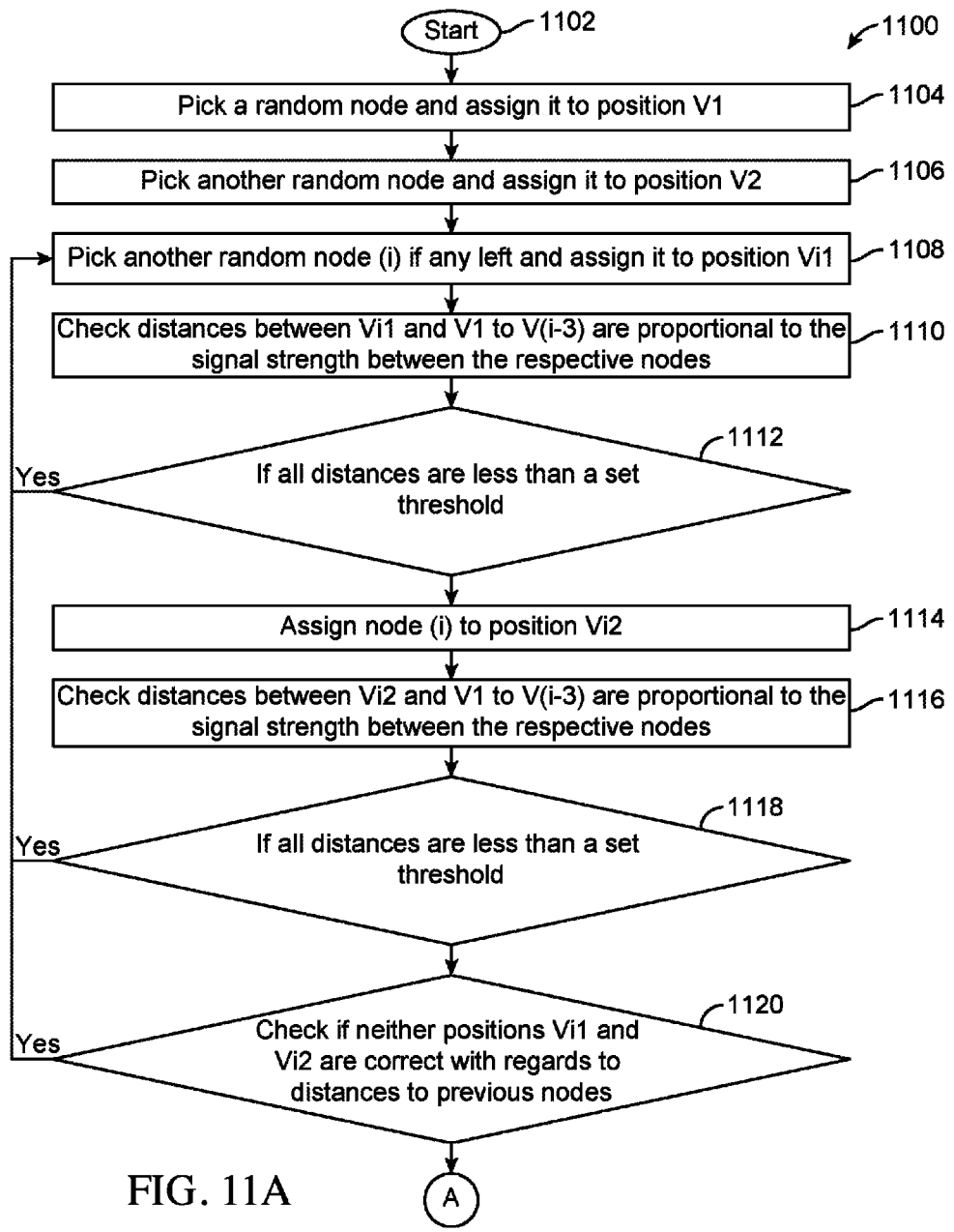
FIGS. 11A and 11B is a flow chart illustrating creating a virtual map, according to an aspect.
Figure 11B:
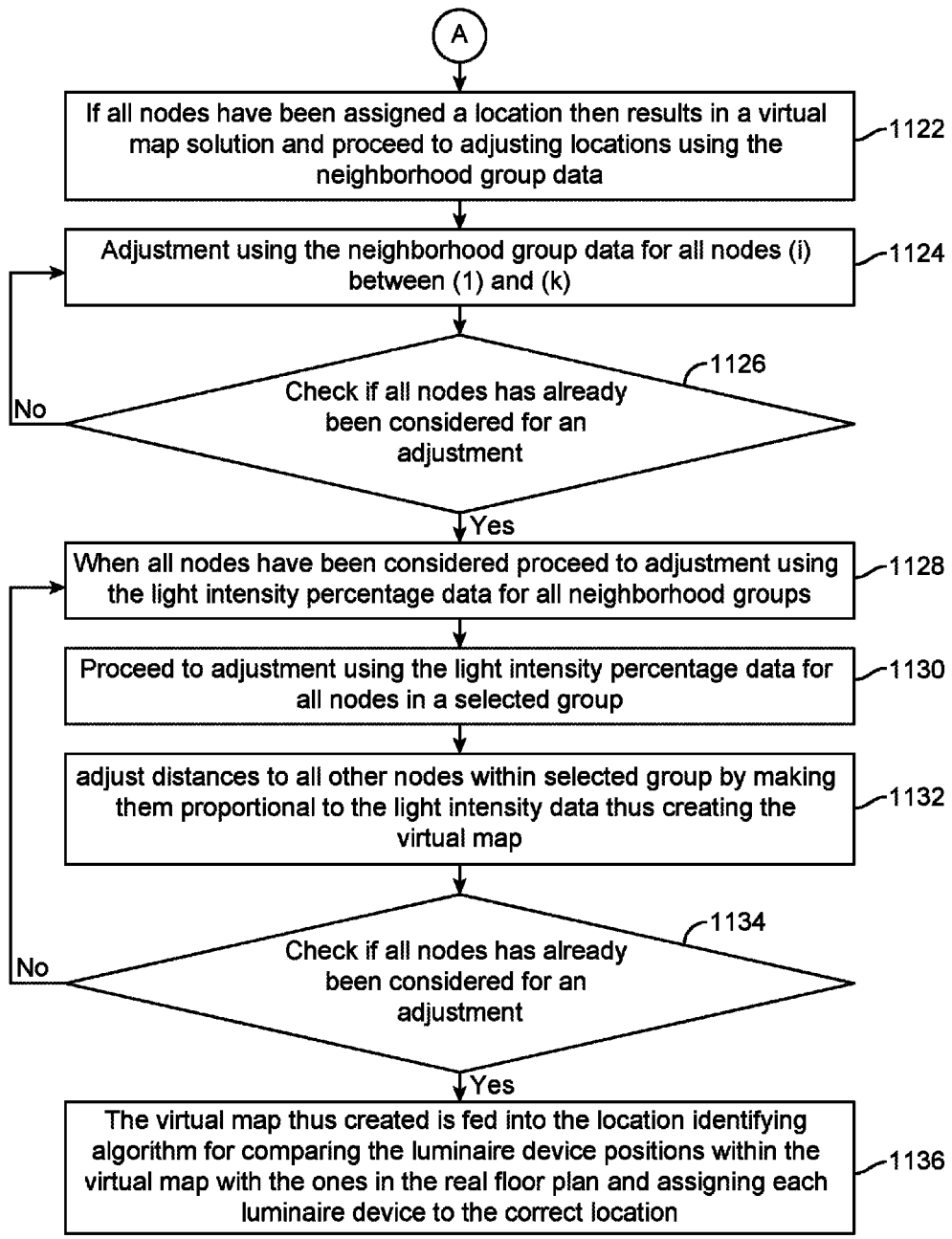

FIGS. 11A and 11B collectively illustrate a flow chart 1102 of an aspect and a method of a system 100, according to an embodiment 1100. In an aspect, the disclosure relates to a method of creating virtual map where each node position is calculated based on other node positions. For purposes of this disclosure, a "node" may refer to, for example and without limitation, a luminaire associated with a gateway, sensor subsystem, control module, and/or other discrete mechanism(s) for accomplishing the disclosed systems and methods.

The virtual map is created using the outputs of three processes namely: an array of light signal strength readings between any pair of two nodes, the calculated neighborhood group of each node, and an array of the signal strength data (as percentage) for any pair of two nodes.

I. Using the signal strength data:
 1. Pick a random node and assign it to position V1 1104.
 2. Pick another random node and assign it to position V2 1106, where V2 is proportional with the light and/or radio frequency (RF) signal strength measured between the two points. The light and/or RF signal strength is measured using the down looking sensor.
 3. Pick another random node (i) if any left and assign it to position Vi1 1108, where Vi1 is the first point of intersection between possible node i location spaces based on distances to V(i−2) and V(i−1).
    a. Check distances between Vi1 and V1 to V(i−3) to see if the distances are proportional to the light and/or RF signal strength between the respective nodes 1110. If all distances are less than a set threshold, go back to 3. considering node (i+1) 1112.
 4. If all distances are not less than a set threshold, assign node (i) to position Vi2 1114, where Vi2 is the second point of intersection between possible node (i) location spaces based on distances to V(i−2) and V(i−1).
    a. Check distances between Vi2 and V1 to V(i−3) to see whether they are proportional to the light and/or RF signal strength between the respective nodes 1116. If all distances are less than a set threshold, go back to 3. considering node (i+1) 1118.
 5. If neither positions Vi1 and Vi2 are correct with regards to distances to previous nodes 1120, return to 3. for node (i−1) and continue using next possible location.
 6. If all nodes have been assigned a location we will consider this as a virtual map solution and proceed to adjusting locations using the neighborhood group data 1122.

II. Adjustment using the neighborhood group data:
 7. For all nodes (i) between (1) and (k), if node (i) adjust Vi by reducing the distance to all nodes on different neighborhood groups by a predefined factor 1124. Skip this for any node that has already been considered for an adjustment. When all nodes have been considered 1126, proceed to adjusting using the light signal strength data.

III. Adjustment using the light signal strength data:
  8. For all neighborhood groups 1128
  9. For all nodes in a selected group 1130
  10. Adjust distances to all other nodes within selected group by making them proportional to the light signal strength data 1132. Skip this for any node that has already been considered for adjustment 1134.
  11. If all nodes have been considered for adjustment, the virtual map created is into the location identifying Algorithm 1136.

Figure 12:
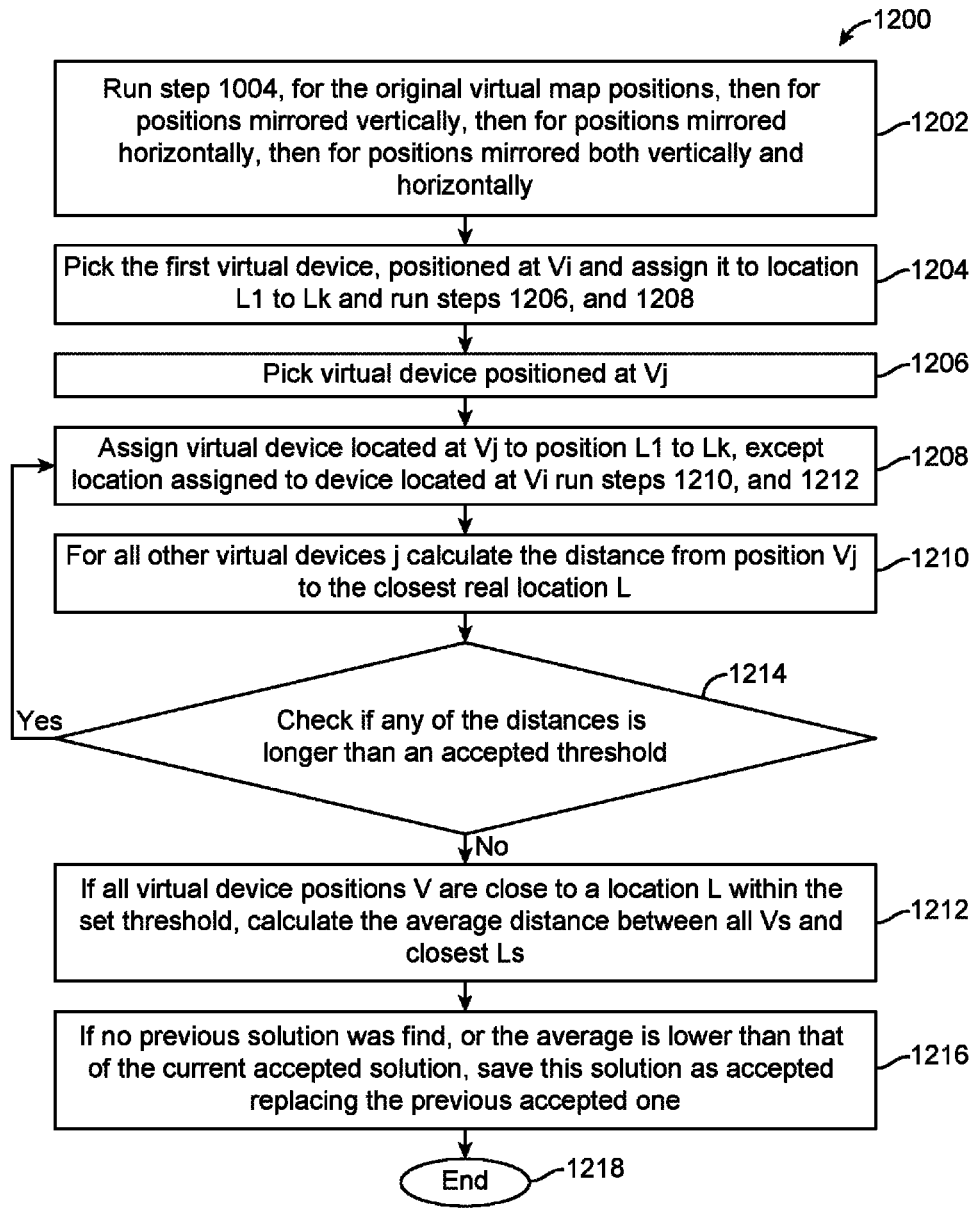
FIG. 12 is a flow chart illustrating comparing the luminaire device positions within the virtual map with the ones in the real floor plan and assigning each luminaire device to the correct location, according to an aspect.

FIG. 12 is a flowchart 1200 illustrating comparing the luminaire device positions within the virtual map with the ones in the real floor plan and assigning each luminaire device to the correct location. Consider the virtual map positions V1, V2, . . . Vk, and real map locations L1, L2, . . . Lk, where k is the number of luminaries.
  1. Run 2. for the original virtual map positions, then for positions mirrored vertically, then for positions mirrored horizontally, then for positions mirrored both vertically and horizontally 1202.
  2. Pick the first virtual device, positioned at Vi and assign it to location L1 to Lk; Run steps a. and b 1204.
    a. Pick virtual device positioned at Vj 1206, where i is calculated so the distance between the first virtual devices Vi and device located at Vj is the closest to the average of distances between Vi and all other device locations;
    b. Assign virtual device located at Vj to position L1 to Lk, except location assigned to device located at Vi 1208; Run steps i. and ii.
      i. For all other virtual devices j calculate the distance from position Vj to the closest real location L 1210. If any of the distances is longer than an accepted threshold 1214, stop and return to step b.
      ii. If all virtual device positions V are close to a location L within the set threshold, calculate the average distance between all Vs and closest Ls 1212. If no previous solution was found, or the average is lower than that of the current accepted solution, save this solution as accepted replacing the previous accepted one 1216. In an embodiment, the process of comparing the luminaire device positions within the virtual map with the ones in the real floor plan and assigning each luminaire device to the correct location ends 1218.

An exemplary method of automated commissioning process by light level data and signal strength data resulting in correct positioning of each luminaire device to the correct floor plan location and assigning each luminaire device to the correct location within a focused area is herein described with the following illustration with reference to FIGS. 13-16.

Figures 13, 14, 15:
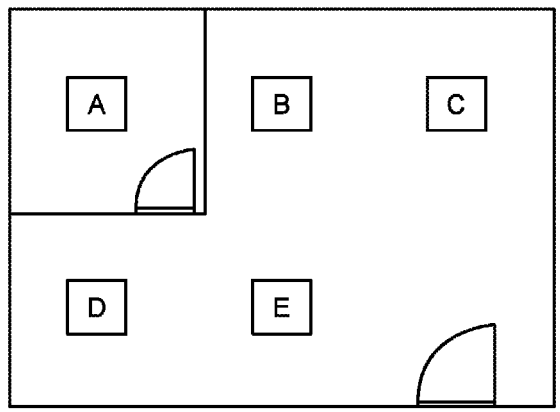
FIG. 13 is a diagram illustrating automated commissioning process resulting in correct positioning of each luminaire device, according to an aspect.
FIG. 14 is a diagram illustrating process of acquiring wireless device light signal strength data, according to an aspect.
FIG. 15 is a diagram illustrating process of acquiring neighborhood grouping data, according to an aspect.

FIG. 13 shows luminaires A-E in a given environment, where the actual locations of luminaires A-E may be unknown. Hypothetical wireless signal strengths between each of luminaires A-E are reflected in the chart of FIG. 14. As shown in FIG. 14, signal strengths between luminaires B-C, B-E, and D-E are the strongest and within a range of −41 dBm±1 dBm. Accordingly, as shown in FIG. 15, luminaires B-E may be assigned to a group ("Group 2") while luminaire A remains in separate Group 1.

Next, in FIG. 16, hypothetical percentages from a comparison of baseline ambient light levels versus test ambient light levels as measured by the sensory subsystem(s) associated with luminaires A-E and respectively saved as first and second two-dimensional arrays according to the disclosed method are presented. Based on the comparison, the hypothetical results of FIG. 16 show that the percentage of ambient light versus current (test) readings is, from highest to lowest, between luminaires D-E, B-C, B-E, C-E, D-B, C-D, A-D, A-E, and A-B. Accordingly, a virtual map (FIG. 13) of the luminaire locations as a function of the percentages of baseline versus test readings, and therefore proximity between respective luminaires, may be created.

Further, an obstruction between luminaire A and the other luminaires (B-E) may be assumed because of the large discrepancy between the light detected from luminaire A (i.e., order of magnitude 0%-15%) and luminaires B-E (i.e., order of magnitude 57%-84%). Thus, as shown in FIG. 13, a wall or other structure may isolate luminaire A at least in part from the other luminaires.

With reference now to FIGS. 17-24, an exemplary method of the disclosed commissioning process using wireless signal strength data, randomly assigned nodes, and neighborhood adjustments is disclosed. Start with considering the location of one of the devices such as device A in FIG. 17. Considering u as a basic distance unit, all other devices will be placed in a range of a length that is a multiple u, proportional to the signal strength as recorded by device A. The possible locations of devices B-E should be considered as shown in FIG. 17.

With continuing reference to FIG. 17, and now FIG. 18, place the second device ("B") on a random position within the correct range to device A. This leads to finding possible positions of devices C-E based on their range to device B. For example, devices C-E can only be at the intersection of possible positions in relation to A with the possible positions in relation to B. As such, device C can only be in one of the two C1 and C2 positions, while devices D and E can only be located in a similar manner as shown in FIG. 18. With devices A and B provisionally placed and only 2 possibilities for devices C, D and E, to filter incorrect possibilities for devices C-E consider the possible location of device D in relation to locations C1 and C2 and the location of device C in relation to locations A and B using signal strength data from each potential location. For purposes of this example, we will hypothetically note that locations C1 and D2 match previous selected locations for A and B based on the received signal strength at each associated node. Hence, locations C1 and D2 are the correct locations for devices C and D.

Figure 19:
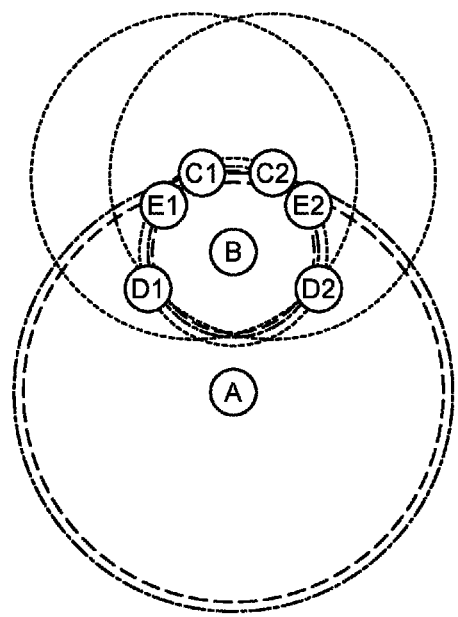
FIG. 19 is a diagram illustrating correct locations for devices identified C and D, according to an aspect.

FIG. 19 is a diagram illustrating correct locations for devices identified as C and D according to an aspect.

Figure 20:
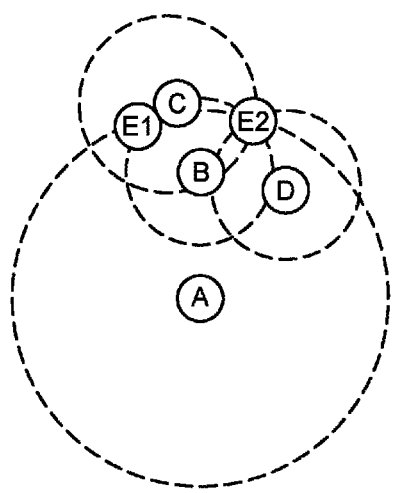
FIG. 20 is a diagram illustrating location of device identified E2, according to an aspect.

With reference now to FIG. 20, the device E location is alone left to find, and it can be one of E1 and E2. Knowing the locations of C and D, the information related to signal strength from locations E1 and E2, respectively, to locations C1 and D2 can be used to determine the proper location of device E. Hypothetically, we find that in this case E2 is the proper location based on signal strength from that location, as shown in FIG. 20. Thus, based on the signal strength data a virtual map is created as shown in FIG. 21.

With continuing reference to FIG. 21, and now reference to FIGS. 22-24, one of the factors that could affect the signal strength data is obstructions to a particular signal, such as physical or electromagnetic interference. Neighborhood group data may be used to account and adjust for erroneous data caused by such obstructions. For example, as shown in FIG. 21, based on the data device A may be considered in a different location or group than all the others because the signal strength readings are showing a longer than actual signal distance due to an obstruction. Thus, as a neighborhood group data adjustment the distances between A and the rest of the devices are shortened by a factor k, where k is a predefined constant. The result is an adjusted virtual map as shown in FIG. 22.

Further, the precision of location data is increased using light level percentage data. Using the example discussed with respect to FIG. 13, it is known that device A is in a different room, or not local to the other devices. However, devices B-E are in the same group and hence their respective ambient light data can be used to alter their presumptive locations as shown in FIG. 23. However, after adjusting for an obstruction such as a wall surrounding device A using, e.g., signal strength data, neighborhood data grouping, and ambient light data, device A may be included in the group comprising devices B-E and the new virtual map is shown in FIG. 24.

After creating a virtual map, where all luminaire devices are located correctly relative to each other, the luminaire device positions are compared within the virtual map with the ones in the real floor plan and then assigned to the correct location using a location identifying algorithm.

Figure 25:
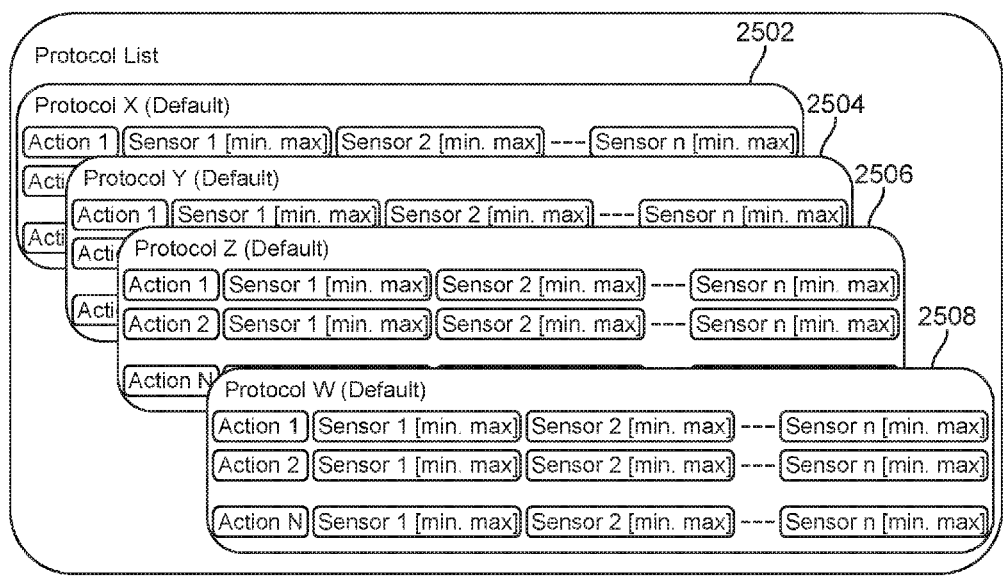
FIG. 25 is a diagram illustrating a list of protocols and their related actions and expected value range for sensor measurements of a system, according to an aspect; and, FIG. 26 is a flow chart illustrating a protocol discovery process of a system including a discovery algorithm, according to an aspect.

FIG. 25 illustrates an embodiment of a protocol list data structure for the gateway. The data structure may be designed such that it is easy to traverse the protocol options and pick the correct protocol during the discovery process. The protocol list includes N protocols, were N can be any number. In an embodiment, each protocol (X, Y, Z ... W) contains directives to the gateway to setup the specific protocol interface (e.g., power level, specific line connections, and other required information as dictated by the protocol standard interface). Further, each protocol may contain a set of directives/actions numbered 1-N. The discovery process may use these directives to take actions like sending a message or changing the voltage level over the dimming control lines. According to an aspect, each action in the list is associated with a list of sensor measurement ranges, one per sensor and per power meter. These measurement ranges may be compared with actual readings as part of the dimming protocol discovery process. In an embodiment, at least one of the protocols, without limitation, can be marked as a default protocol W. According to an aspect, this is the protocol to which the gateway will default into when no other protocol is discovered.

Figure 26:
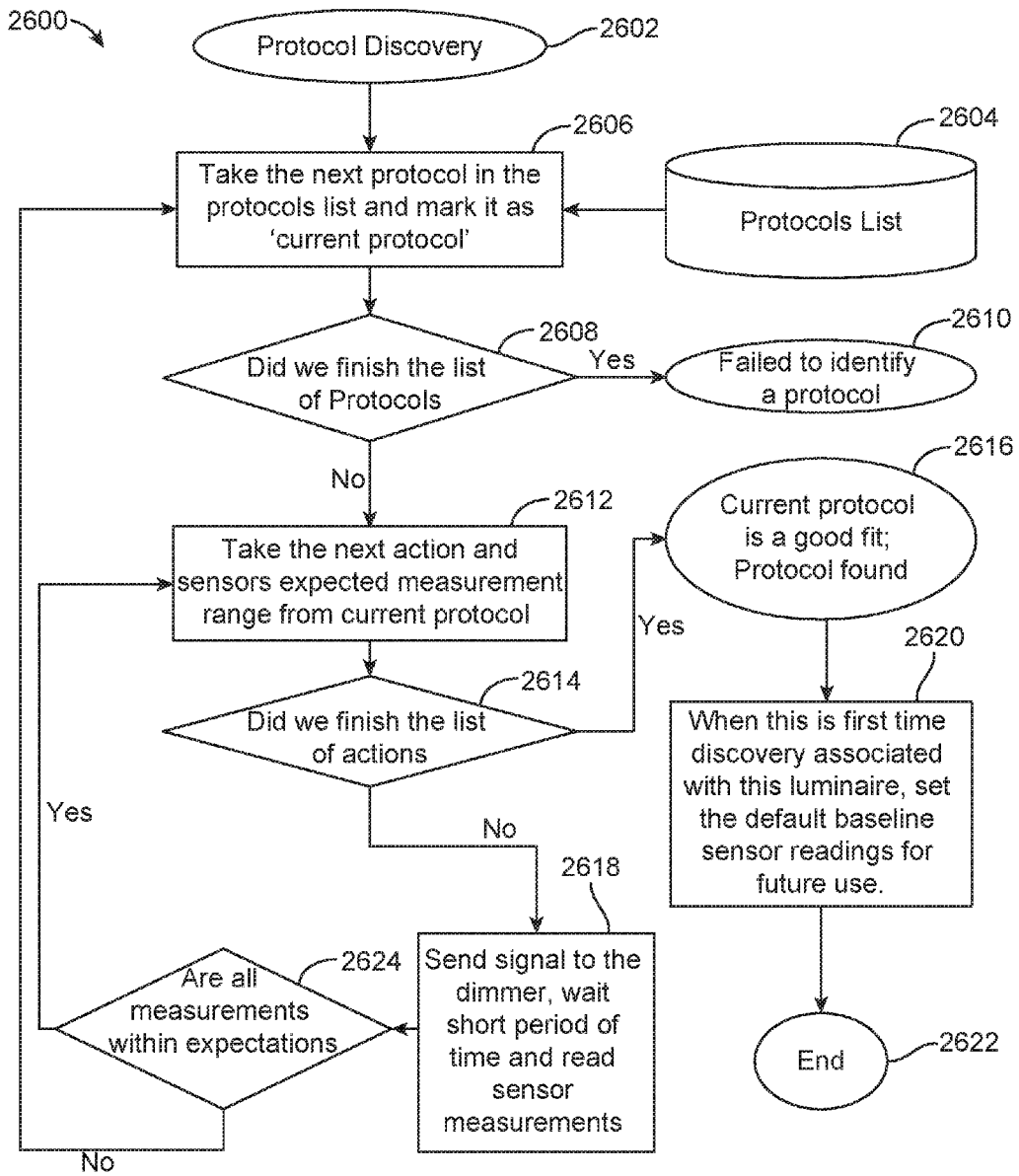

FIG. 26 illustrates an embodiment of the protocol discovery process 2600. According to an aspect, the protocol is determined from a list of protocols, as seen, for instance, in FIG. 25. The process may include retrieving/taking/assuming a protocol from the list of protocols, and mark it as the "current protocol" 2606. The current protocol may include a dimming control protocol. The system may check if the entire list of protocols is finished 2608. If the list is completed 'Yes', then the next step of operation goes to step 2410, which may indicate that there has been a failure to identify a protocol. In an embodiment, when a current protocol that has passed all of the verifications correctly is found, proper identification of the protocol and/or the identification process will be successfully achieved. If the list is not finished, No', then the next step of operation may go to step 2612 where the system activates the next action inside the protocol, and takes measurements via the sensors, based on a previously identified range. In other words, the system expects the measurements to be in specific ranges using the current protocol. In an embodiment, the method further includes receiving at least one real time sensing measurement from at least one sensor subsystem. The gateway may utilize the at least one real time sensing measurement to correlate between the at least one dimming control protocol and between the plurality of luminaires. The sensor subsystem may be configured substantially as described hereinabove and illustrated in FIG. 3, and may include at least one of a color sensor and an environment sensor. Each of the sensor subsystem 108 and the power meter 114 may be physically connected to the at least one gateway 102, and the real time sensing measurement may be received by the at least one gateway 102 via at least one sensor interface 128. According to an aspect, the gateway 102 may be connected to the at least one power meter 114 via a Universal Asynchronous Receiver/Transmitter interface 132. According to an aspect, the gateway 102 may also be connected to at least one network gateway 104 in a backhaul interface 118 via at least one of a LAN, a WLAN, a WAN, and a Mesh BLE radio network. In an embodiment, at least one network gateway 104 is connected to at least one cloud server 106 via the WAN.

The system may check whether the entire list of actions has been finished/completed at step 2614. If the actions are finished, 'Yes', then the next step of operation is step 2616 which may include determining that the current protocol is a good choice/fit for the system, and the protocol may be finalized. According to an aspect, after the protocol is found, the system saves the default baseline sensor readings for future use 2620. In an embodiment, the process ends 2622. According to an aspect, if the actions are not finished 'No', then the next step of operation may be where the system sends signals to the dimmer, waits a short period of time and reads sensor measurements 2618.

According to an aspect, the measurement, such as, for example, the real time sensing measurement, is taken to see if they are within expectations 2624. If 'Yes', measurement is within expectations then the system moves back to select the next action in the protocol verification process 2612. If 'No', such as, for instance, measurement is outside the normal range, the system may move back to step 2606, where it will pick a new protocol to check. The steps in the process may include the following: The protocol list includes a pointer to the 'next protocol' and marks it as current protocol in use with this device. If no protocol is the 'next protocol', the pointer may be pointing to an empty protocol indicating that the beginning of the list is next. The algorithm's first step is to advance the last protocol pointer to the next protocol in the list. If there are no protocols, e.g., after advancing through the end with an empty protocol, then there are no more protocols to check and the algorithm chooses the default protocol in the list, or simply exits with failure. In case the protocols list is not exhausted, there is a valid 'current protocol' to verify. The gateway sets up the dimming control lines to match the requirements of the 'current protocol'.

For every action in the 'current protocol', the gateway may take this action, wait a given amount of time associated with this action within the 'current protocol' action record information, and then reads current sensor measurements. If any of the measurements are outside the correlated range indicated by the sensor records list associated with this 'current protocol' and action, the gateway may move to the next protocol and start from the beginning to verify this new protocol. In cases where the sensor measurements meet the expected measurements indicated in the sensors list data range, the gateway may proceed to the next action in the list of 'current protocol'. In cases when there are no more actions to measure within the 'current protocol', the gateway may choose this 'current protocol' as the correct protocol for this device.

Protocol discovery can happen for multiple reasons. For example, when protocol discovery is initiated due to change in luminaire or when a new luminaire is being connected, the discovery protocol may add a step in which the base sensor parameters are updated to reflect the characteristics of the new luminaire. According to an aspect, this action helps set expected values and tune dimming parameters to sensor readings, such that appropriate correlation can be achieved. The gateway may keep historical correlated values for its sensor to enable correlation that is time dependent. For example, LED-based luminaire lumen values and the sensor readings may be impacted by the lumen state of the LED, and the lumen state and readings of the LED may deteriorate over time. According to an aspect, retaining/keeping historical or accumulated information may allow the gateway system to identify change in readings over time and to adjust the dimming directives to reflect the requested dimming level correctly. According to an aspect, the at least one gateway may distinguish between a digital protocol and at least one analog protocol. In an embodiment, the digital protocol includes one of DALI and DMX, and the analog protocol includes one of 0V-10V and 1V-10V.

The components of the system illustrated are not limited to the specific embodiments described herein, but rather, features illustrated or described as part of one embodiment can be used on or in conjunction with other embodiments to yield yet a further embodiment. It is intended that the system include such modifications and variations. Further, steps described in the method may be utilized independently and separately from other steps described herein.

The devices, systems, and methods have been described above, with reference to specific embodiments; it will be understood by those skilled in the art that various changes may be made and equivalents may be substituted for elements thereof without departing from the scope of the disclosure. In addition, many modifications may be made to adapt a particular situation or material to the teachings found herein without departing from the essential scope thereof.

The present disclosure, in various embodiments, configurations and aspects, includes components, methods, processes, systems and/or apparatuses as depicted and described herein, including various embodiments, sub-combinations, and subsets thereof. Those of skill in the art will understand that the various disclosed embodiments, configurations, and aspects include providing devices and processes in the absence of items not depicted and/or described herein or in various embodiments, configurations, or aspects hereof, including in the absence of such items as are known by those of ordinary skill in the art.

The foregoing discussion of the exemplary embodiments has been presented for purposes of illustration and description. The foregoing is not intended to limit the scope of the disclosure to the form or forms recited herein. In the foregoing Detailed Description for example, various features of the exemplary embodiments are grouped together in one or more embodiments, configurations, or aspects for the purpose of streamlining the disclosure. The features of the embodiments, configurations, or aspects of the exemplary embodiments may be combined in alternate embodiments, configurations, or aspects other than those discussed above. This method of disclosure is not to be interpreted as reflecting an intention that the exemplary embodiments require more features than may be recited in each claim. Thus, the following claims are hereby incorporated into this Detailed Description, with each claim standing on its own as a separate illustrative embodiment.

Moreover, the description of the exemplary embodiments has included descriptions of one or more embodiments, configurations, or aspects, and certain variations and modifications, other variations, combinations, and modifications that are within the scope of the disclosure as may be within the skill and knowledge of those in the art, including alternate, interchangeable and/or equivalent structures, functions, ranges or steps to those claimed, whether or not such alternate, interchangeable and/or equivalent structures, functions, ranges or steps are disclosed herein.

In this specification and the claims that follow, reference will be made to a number of terms that have the following meanings. The singular forms "a," "an" and "the" include plural referents unless the context clearly dictates otherwise. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

Advances in science and technology may make equivalents and substitutions possible that are not now contemplated by reason of the imprecision of language; these variations should be covered by the appended claims. This written description uses examples to disclose the method, machine and computer-readable medium, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system for automatic luminaire location identification and group assignment, comprising:
   a first gateway configured to control operation of at least one luminaire via at least one control interface;
   a sensor subsystem in data communication with the first gateway; and,
   a server in data communication with the first gateway, wherein
      the sensor subsystem is configured to measure and transmit at least one of color and environmental data to the server via the first gateway, and
      the server is configured to receive the data transmitted by the sensor subsystem, identify each luminaire and create a virtual map of luminaire positions based on the received data, compare the luminaire positions in the virtual map with luminaire positions in a real floor plan of the environment, and assign each identified luminaire to a luminaire position in the real floor plan.

2. The system of claim 1, further comprising at least one luminaire having at least one light emitting diode (LED).

3. The system of claim 1, wherein the control interface is a dimming control interface and the server is configured to control the dimming control interface via the first gateway.

4. The system of claim 1, wherein the sensor subsystem comprises at least one of a color sensor and an environment sensor.

5. The system of claim 4, wherein the color sensor is configured to transmit at least one of color and light intensity data to the server.

6. The system of claim 4, wherein the environment sensor is configured to face away and/or extend in a downward direction from the luminaire.

7. The system of claim 6, wherein the environment sensor provides data related to at least one of ambient light level, intensity, and output, temperature, orientation of objects, movement and direction, humidity, and footfall.

8. The system of claim 4, wherein the environment sensor comprises a low-resolution image sensor configured to measure light intensity of pixels and received images.

9. The system of claim 1, further comprising a network gateway, wherein the network gateway is in data communication with the first gateway and the server, the server is a cloud-based server, and the network gateway is in wireless communication with the cloud-based server.

10. The system of claim 1, wherein the server is configured to direct and control the first gateway.

11. The system of claim 10, wherein the first gateway is configured to control power to the luminaire to dim the luminaire or turn the luminaire ON or OFF.

12. The system of claim 1, further comprising a user device with a user interface, wherein the first gateway is configured to transmit via the server data regarding at least one of the identification, grouping, and status of the luminaire to the user device.

13. A method of automatic luminaire location identification and group assignment in an environment containing at least one luminaire having at least one light emitting diode (LED), comprising:
   switching OFF unidentified luminaires;
   collecting with a sensor subsystem at least one of ambient color and environmental data of the environment;
   winking ON then OFF unidentified luminaires one by one, detecting with the sensor subsystem light patterns emitted by the unidentified luminaires, and storing the light patterns in at least one server as a first two-dimensional array;
   switching ON a luminaire in the first two-dimensional array and assigning the luminaire as a member of a lighting control group;
   winking remaining unidentified luminaires ON one by one, detecting with the sensor subsystem light patterns emitted by the remaining luminaires, and storing the light patterns as a second two-dimensional array in the at least one server;
   comparing with the server the first and second two-dimensional arrays to identify localized changes in lighting levels within a focused area of the first two-dimensional array representing at least one new luminaire that is within proximity to a luminaire within the lighting control group; and,
   adding the at least one new luminaire to the lighting control group.

14. The method of claim 13, further comprising obtaining updated baseline light patterns by switching OFF all luminaires, winking each luminaire in the lighting control group ON then OFF one by one, and detecting with the sensor subsystem any changes in natural light ingress.

15. The method of claim 14, further comprising repeating the method steps until no additional lighting group members are identified.

16. The method of claim 13, wherein at least one of the first and second two-dimensional arrays includes network identifications (IDs), ambient light intensity values, ON/OFF state, and a lighting group identification.

17. The method of claim 13, further comprising collectively winking the luminaires of the lighting control group to determine a physical location of the group within the environment.

18. The method of claim 13, further comprising communicating data and light patterns collected and detected by the sensor subsystem to the server via a gateway, wherein switching and winking luminaires is controlled via commands from the gateway and the server is configured to direct and control the gateway.

19. The method of claim 18, further comprising communicating information regarding at least one of the data, light patterns, luminaire state, and lighting control group from the server to a user device.

20. A method of automatically creating a map of luminaire node positions within an environment, comprising:
   picking a first random node and assigning it to a first position;
   picking a second random node and assigning it to a second position having a distance that is proportional with at least one of a light and radio frequency (RF) signal strength measured by a sensor subsystem between the two nodes;
   picking a remaining random node and assigning it to an ith position, wherein the ith position is a point of intersection between radii of the first position and second position proportional to the signal strength as recorded by the first random node;
   verifying that a distance between the ith position and second position to the first position are less than a set threshold;
   adjusting the first through ith node positions in a selected group by making the distance between nodes proportional to light intensity percentage data as measured by the sensor subsystem;

saving the adjusted node positions to a server as a virtual map; and, comparing the node positions in the virtual map to node positions in a real floor plan of the environment and assigning each of the first through ith node positions to a node position in the real floor plan.

* * * * *